United States Patent
Swaminathan et al.

(10) Patent No.: US 10,728,597 B2
(45) Date of Patent: Jul. 28, 2020

(54) VIDEO MARKER SYSTEM AND METHOD

(71) Applicant: CenturyLink Intellectual Property LLC, Denver, CO (US)

(72) Inventors: Gnanasekaran Swaminathan, Monroe, LA (US); Steven M. Casey, Littleton, CO (US); Felipe Castro, Erie, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 129 days.

(21) Appl. No.: 15/389,786

(22) Filed: Dec. 23, 2016

(65) Prior Publication Data

US 2018/0070118 A1  Mar. 8, 2018

Related U.S. Application Data

(60) Provisional application No. 62/384,000, filed on Sep. 6, 2016.

(51) Int. Cl.
| | |
|---|---|
| H04N 21/2543 | (2011.01) |
| H04N 21/442 | (2011.01) |
| H04N 21/658 | (2011.01) |
| H04N 21/235 | (2011.01) |
| H04N 21/472 | (2011.01) |

(52) U.S. Cl.
CPC ..... *H04N 21/25435* (2013.01); *H04N 21/235* (2013.01); *H04N 21/44204* (2013.01); *H04N 21/6582* (2013.01); *H04N 21/47202* (2013.01)

(58) Field of Classification Search
CPC ............. H04N 21/812; H04N 21/4331; H04N 21/236; H04N 21/4725; H04N 21/858; H04N 21/2407; H04N 21/23424; H04N 21/2353; H04N 21/44204; H04N 21/8352; H04N 21/8455; H04N 21/8456
USPC ......................................................... 725/32
See application file for complete search history.

(56) References Cited

U.S. PATENT DOCUMENTS

| | | | | |
|---|---|---|---|---|
| 5,872,588 | A * | 2/1999 | Aras | H04N 7/17354 |
| | | | | 348/E7.075 |
| 8,856,825 | B1 * | 10/2014 | Mick, Jr. | H04N 21/812 |
| | | | | 725/32 |
| 9,253,534 | B1 * | 2/2016 | Landers | H04N 21/25891 |
| 2010/0280876 | A1 * | 11/2010 | Bowra | G06Q 30/0242 |
| | | | | 705/14.41 |
| 2013/0007794 | A1 * | 1/2013 | Besehanic | H04L 65/607 |
| | | | | 725/20 |

(Continued)

*Primary Examiner* — Alfonso Castro

(57) ABSTRACT

Novel tools and techniques might provide for implementing media content tracking functionality, and, in particular embodiments, implementing temporal markers for tracking at least partial playback of media content. In various embodiments, a computing system might receive a request for media content from a user over a network, and might retrieve the media content from a database. A transcoder might insert temporal markers in a transport stream of the media content, which is sent to the user device. The user device might decode the transport stream, might track each temporal marker as the media content is presented to the user, might generate a message by compiling a list of the accessed temporal markers, and might send the message to the computing system. The computing system might receive the message comprising the list of temporal markers, which are indicative of portions of the media content that were actually presented to the user.

20 Claims, 10 Drawing Sheets

(56) References Cited

U.S. PATENT DOCUMENTS

| | | | |
|---|---|---|---|
| 2013/0205311 A1* | 8/2013 | Ramaswamy | H04N 21/44213 725/9 |
| 2014/0282671 A1* | 9/2014 | McMillan | H04N 21/8352 725/19 |
| 2015/0067715 A1* | 3/2015 | Koat | H04H 60/15 725/25 |

* cited by examiner

VIDEO MARKER SYSTEM AND METHOD

CROSS-REFERENCES TO RELATED APPLICATIONS

This application claims priority to U.S. Patent Application Ser. No. 62/384,000, filed Sep. 6, 2016 by Gnanasekaran Swaminathan et al., entitled, "Transactional Segment VOD Playback and Billing," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing media content tracking functionality, and, in particular embodiments, to methods, systems, apparatus, and computer software for implementing temporal markers for tracking at least partial playback of media content (e.g., video content and/or audio content) by users.

BACKGROUND

Conventional television or video on demand ("VOD") systems (as well as conventional audio on demand ("AOD") or music on demand ("MOD"), etc.) do not seem to currently track the amount of content that a user (or a plurality of users) actually view (or listen to) for any particular television or VOD content (or for any particular music content, etc.). Such conventional systems also do not appear to track partial consumption of media content (including video and/or audio content) for purposes of billing users for actual consumption of the media content; rather for subscription VOD or transactional VOD, the user must pay for the entire media content regardless of whether or not the user actually consumes the entire media content.

Further, conventional ratings track or the like do not appear to track the amount as well as the particular portions of particular media content that are actually consumed by each of a plurality of users. Such information, for example, could be used by content providers to improve production of future content, could be used by content distributors to improve distribution of future content better suited to the plurality of users, could be used by advertisers to better target ads to the plurality of users, and/or the like.

Hence, there is a need for more robust and scalable solutions for implementing media content tracking functionality, and, in particular embodiments, to methods, systems, apparatus, and computer software for implementing temporal markers for tracking at least partial playback of media content by users.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
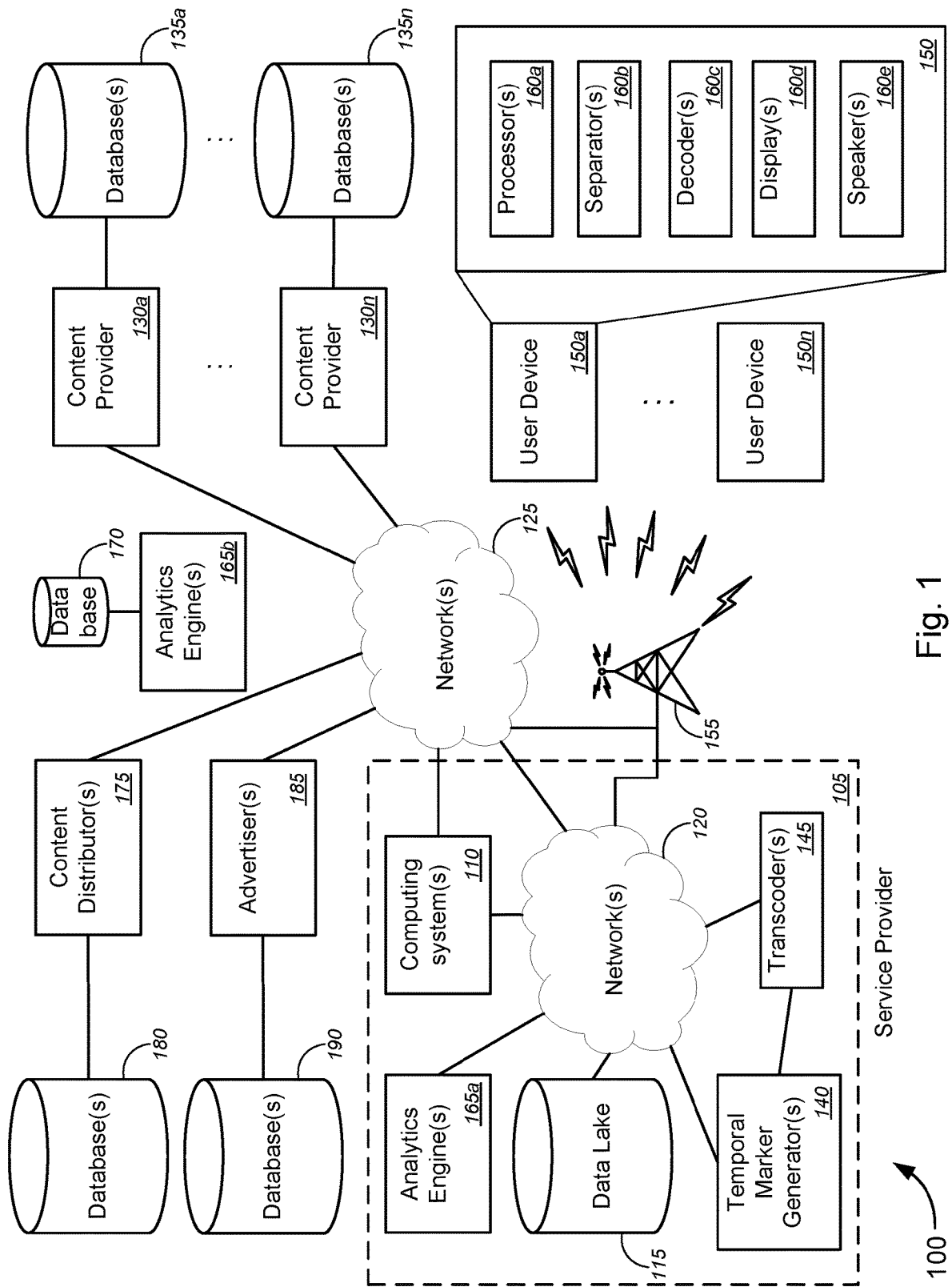
FIG. 1 is a schematic diagram illustrating a system for implementing temporal markers for tracking at least partial playback of media content by users, in accordance with various embodiments.

Various embodiments provide tools and techniques for implementing media content tracking functionality, and, in particular embodiments, to methods, systems, apparatus, and computer software for implementing temporal markers for tracking at least partial playback of media content by users.

In various embodiments, a computing system of a service provider might receive a request for a first media content from a user (or a user device associated with the user) over a network. The computing system might retrieve the first media content from a database over the network. A transcoder might insert a plurality of temporal markers in a transport stream of the first media content, which might be sent, by the computing system, to the user device for presentation of the first media content to the user. The user device might decode the transport stream, might present the first media content to the user, might track each of one or more temporal markers as the first media content is being presented to the user, might generate a first message by compiling a list of the accessed one or more temporal markers, and might send the generated first message to the computing system. The computing system might receive the first message comprising the list of the one or more temporal markers of the plurality of temporal markers that were accessed when the first media content was presented to the user, the one or more temporal markers that were accessed being indicative of portions of the first media content that were actually presented to the user.

According to some embodiments, the database might be one of one or more databases associated with the service provider, one or more databases associated with corresponding one or more content providers whose servers might provide the first media content, or one or more databases associated with one or more content distributor servers associated with one or more content distributors, and/or the like. In some embodiments, the plurality of temporal markers might correspond to a predetermined set of increments or intervals, including, but not limited to, one-second increments, one-minute increments, two-minute increments, five-minute increments, ten-minute increments, fifteen-minute increments, thirty-minute increments, or one-hour increments, and/or the like. According to some embodiments, the temporal markers that are tracked need not be sequential or in order (i.e., in the case that the user skips whole sections of the first media content or in the case that the user jumps ahead to sections and jumps back or otherwise jumps around in terms of playback of the first media content). Regardless, the user device might track precisely which segments (by incremental section or particular interval) that is actually consumed (i.e., viewed or listened to) by the user.

Merely by way of example, in some cases, the computing system might calculate an amount to bill the user based at least in part on a fraction of a cost of the first media content as calculated by dividing the first length by the total length of the first media content, and might track similar partial or full consumption of media content by the user over a billing period (e.g., per day, per week, per month, per half year, per year, etc.). In this manner, the user is not charged for portions of the media content that he or she either is unable to view or listen to or decides not to view or listen to (e.g., if the user does not like the media content so far, or the like).

The computing system might similarly track such partial or full consumption of media content by a plurality of users, and might send such information to an analytics engine. The analytics engine might aggregate the information regarding which portions of a particular media content were actually presented to each of the plurality of users, based at least in part on the list of the at least one temporal marker contained in messages from each of a plurality of user devices associated with each of the plurality of users, and might send (or otherwise provide) the aggregated information to at least one of one or more content providers associated with the first media content, one or more content distributors that distribute the first media content, or one or more advertisers, and/or the like. Such aggregation of information regarding which portions of a particular media content were actually presented to each of the plurality of users might similarly be performed for each of a plurality of media content, and the analytics engine might track such information to provide trending information to the at least one of the one or more content providers associated with the first media content, the one or more content distributors that distribute the first media content, or the one or more advertisers, and/or the like. In this way, the content providers may be better informed as to what parts of a movie, television show, reality TV show, game show, news program, sports coverage, music videos, video clips, music, audio clips, etc. that one or more users (or one or more demographics of users) are actually watching, in order to tailor future content that might likely view or listen to. Likewise, content distributors may be better informed as to what parts of a movie, television show, reality TV show, game show, news program, sports coverage, music videos, video clips, music, audio clips, etc. that one or more users (or one or more demographics of users) are actually watching, in order to compile or purchase, from content providers, future content that might likely view or listen to. Similarly, advertisers might be better informed as to what parts of a movie, television show, reality TV show, game show, news program, sports coverage, music videos, video clips, music, audio clips, etc. that one or more users (or one or more demographics of users) are actually watching, in order to tailor ads to users and/or to choose what portions of future content to request display of their ads to users, and/or the like. Such information may also be used by the service provider to more accurately determine how much it should pay the content provider(s) and/or the content distributor(s) due to partial consumption by the plurality of users.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, media content tracking technology, media content distribution and presentation technology, and/ or the like. In other aspects, certain embodiments, can improve the functioning of user equipment or systems themselves (e.g., telecommunications equipment, network components, media content distribution equipment, media content presentation equipment, etc.), for example, by inserting a plurality of temporal markers in a transport stream of a particular media content, presenting the particular media content to a user via a user device, accessing or tracking each of one or more temporal markers as the particular media content is being presented to the user, generating a message by compiling a list of the accessed one or more temporal markers, the one or more temporal markers that were accessed being indicative of portions of the first media content that were actually presented to the user, and/or the like. In particular, to the extent any abstract concepts are present in the various embodiments, those concepts can be implemented as described herein by devices, software, systems, and methods that involve specific novel functionality (e.g., steps or operations), such as inserting a plurality of temporal markers in a transport stream of a particular media content, presenting the particular media content to a user via a user device, accessing or tracking each of one or more temporal markers as the particular media content is being presented to the user, generating a message by compiling a list of the accessed one or more temporal markers, the one or more temporal markers that were accessed being indicative of portions of the first media content that were actually presented to the user, and/or the like, to name a few examples, that extend beyond mere conventional computer processing operations. These functionalities can produce tangible results outside of the implementing computer system, including, merely by way of example, improving tracking of the portions of media content that are actually consumed by the user, allowing billing of the user for only the actually consumed portions of the media content, improving future production of media content based on the tracked actually consumed media content (as consumed by a plurality of users), improving future distribution of media content based on the tracked actually consumed media content (as consumed by a plurality of users), and/or improving advertising based on the tracked actually consumed media content (as consumed by a plurality of users), which may be observed or measured by customers and/or service providers.

In an aspect, a method might comprise receiving, with a computing system of a service provider over a network, a request for a first media content from a user and retrieving, with the computing system, the first media content from a database over the network. The method might also comprise inserting, with a transcoder associated with the service provider, a plurality of temporal markers in a transport stream of the first media content and sending, with the computing system, the transport stream of the first media content to a user device associated with the user for presentation of the first media content to the user. The method might further comprise receiving, with the computing system and from the user device associated with the user, a first message comprising a list of one or more temporal markers of the plurality of temporal markers that were accessed when the first media content was presented to the user, the one or more temporal markers that were accessed being indicative of portions of the first media content that were actually presented to the user.

In some embodiments, the first media content might comprise at least one of video content or audio content, and/or the like. In some instances, the first media content might comprise video on demand ("VOD") content. In some cases, the database might comprise at least one of a database associated with the service provider, a database associated with the network, a database associated with the computing system, a database associated with a content provider that is associated with the first media content, or a database associated with a content distributor that distributes the first media content, and/or the like.

According to some embodiments, the method might further comprise receiving, with the user device, the transport stream of the first media content; decoding, with a decoder communicatively coupled to the user device, the transport stream of the first media content; and presenting, with the user device, the decoded first media content to the user. The method might further comprise accessing, with the user device and from the decoded transport stream, each of the one or more temporal markers as the first media content is being presented to the user; generating, with the user device, the first message by compiling a list of the accessed one or more temporal markers; and sending, with the user device, the generated first message to the computing system.

In some cases, the user might end presentation of the first media content prior to completion of presentation of the first media content, and the one or more temporal markers being accessed might indicate a first length of the first media content that was presented to the user, the first length being less than a total length of the first media content. In some embodiments, the method might further comprise calculating, with the computing system, a first amount to bill the user based at least in part on a fraction of a cost of the first media content as calculated by dividing the first length by the total length of the first media content.

Merely by way of example, according to some embodiments, the method might further comprise receiving, with the computing system and from each of a plurality of user devices associated with a plurality of users, a second message comprising a list of at least one temporal marker of the plurality of temporal markers being accessed when the first media content was presented to each user, the at least one temporal marker that were accessed being indicative of portions of the first media content that were actually presented to each of the plurality of users; aggregating, with an analytics engine, information regarding which portions of the first media content were actually presented to the plurality of users, based at least in part on the list of the at least one temporal marker contained in the second message for each of the plurality of users; and providing, with the analytics engine, the aggregated information to at least one of a content provider associated with the first media content, an advertiser, or a content distributor, and/or the like.

In some embodiments, inserting the plurality of temporal markers in the transport stream of the first media content might comprise inserting, with the transcoder, the plurality of temporal markers in the transport stream of the first media content only at portions of the transport stream corresponding to one of one-second increments, one-minute increments, two-minute increments, five-minute increments, ten-minute increments, fifteen-minute increments, thirty-minute increments, or one-hour increments, and/or the like. Alternatively, inserting the plurality of temporal markers in the transport stream of the first media content might comprise inserting, with the transcoder, the plurality of temporal markers in a header of each packet of the transport stream of the first media content, each header within each temporal increment being inserted with the same temporal marker, the temporal increment comprising one of one-second increments, one-minute increments, two-minute increments, five-minute increments, ten-minute increments, fifteen-minute increments, thirty-minute increments, or one-hour increments, and/or the like.

In another aspect, a system comprise a computing system of a service provider and a transcoder associated with the service provider. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, over a network, a request for a first media content from a user; and retrieve the first media content from a database over the network. The transcoder might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the transcoder to: insert a plurality of temporal markers in a transport stream of the first media content; and send the resultant transport stream of the first media content to the computing system, The first set of instructions, when executed by the at least one first processor, might further cause the computing system to: receive the transport stream from the transcoder; send the transport stream of the first media content to a user device associated with the user for presentation of the first media content to the user; and receive, from the user device associated with the user, a first message comprising a list of one or more temporal markers of the plurality of temporal markers that were accessed when the first media content was presented to the user, the one or more temporal markers that were accessed being indicative of portions of the first media content that were actually presented to the user.

In some embodiments, the first media content might comprise at least one of video content or audio content, and/or the like. In some instances, the first media content might comprise video on demand ("VOD") content. In some cases, the database might comprise at least one of a database associated with the service provider, a database associated with the network, a database associated with the computing system, a database associated with a content provider that is associated with the first media content, or a database associated with a content distributor that distributes the first media content, and/or the like.

According to some embodiments, the system might further comprise the user device and a decoder communicatively coupled to the user device. The decoder might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the decoder to: decode the transport stream of the first media content that is received by the user device. The user device might comprise at least one fourth processor and a fourth non-transitory computer readable medium communicatively coupled to the at least one fourth processor. The fourth non-transitory computer readable medium might have stored thereon computer software comprising a fourth set of instructions that, when executed by the at least one fourth processor, causes the user device to: present the decoded first media content to the user; access, from the decoded transport stream, each of the one or more temporal markers as the first media content is being presented to the user; generate the first message by compiling a list of the accessed one or more temporal markers; and send the generated first message to the computing system.

In some cases, the user might end presentation of the first media content prior to completion of presentation of the first media content, and the one or more temporal markers being accessed might indicate a first length of the first media content that was presented to the user, the first length being less than a total length of the first media content. In some embodiments, the first set of instructions, when executed by the at least one first processor, might further cause the computing system to: calculate a first amount to bill the user based at least in part on a fraction of a cost of the first media content as calculated by dividing the first length by the total length of the first media content.

Merely by way of example, according to some embodiments, the system might further comprise an analytics engine. The analytics engine might comprise at least one fifth processor and a fifth non-transitory computer readable medium communicatively coupled to the at least one fifth processor. The fifth non-transitory computer readable medium might have stored thereon computer software comprising a fifth set of instructions that, when executed by the at least one fifth processor, causes the analytics engine to perform one or more functions. The first set of instructions, when executed by the at least one first processor, might further cause the computing system to: receive, from each of a plurality of user devices associated with a plurality of users, a second message comprising a list of at least one temporal marker of the plurality of temporal markers being accessed when the first media content was presented to each user, the at least one temporal marker that were accessed being indicative of portions of the first media content that were actually presented to each of the plurality of users. The fifth set of instructions, when executed by the at least one fifth processor, might cause the analytics engine to: aggregate information regarding which portions of the first media content were actually presented to the plurality of users, based at least in part on the list of the at least one temporal marker contained in the second message for each of the plurality of users; and provide the aggregated information to at least one of a content provider associated with the first media content, an advertiser, or a content distributor, and/or the like.

In some embodiments, inserting the plurality of temporal markers in the transport stream of the first media content might comprise inserting the plurality of temporal markers in the transport stream of the first media content only at portions of the transport stream corresponding to one of one-second increments, one-minute increments, two-minute increments, five-minute increments, ten-minute increments, fifteen-minute increments, thirty-minute increments, or one-hour increments, and/or the like. Alternatively, inserting the plurality of temporal markers in the transport stream of the first media content might comprise inserting the plurality of temporal markers in a header of each packet of the transport stream of the first media content, each header within each temporal increment being inserted with the same temporal marker, the temporal increment comprising one of one-second increments, one-minute increments, two-minute increments, five-minute increments, ten-minute increments, fifteen-minute increments, thirty-minute increments, or one-hour increments, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

We now turn to the embodiments as illustrated by the drawings. FIGS. 1-8 illustrate some of the features of the method, system, and apparatus for implementing media content tracking functionality, and, in particular embodiments, to methods, systems, apparatus, and computer software for implementing temporal markers for tracking at least partial playback of media content by users, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing temporal markers for tracking at least partial playback of media content by users, in accordance with various embodiments. In the non-limiting embodiment of FIG. 1, system 100 might comprise a service provider 105. At one or more locations associated with the service provider 105, system 100 might include, without limitation, a computing system(s) 110, a data lake or data store(s) 115, and one or more service provider networks 120, and/or the like. System 100 might further comprise network(s) 125, which might communicatively couple at least one of the computing system(s) 110 and/or the one or more service provider networks 120 to each of one or more of content provider servers 130a-130n (collectively, "content provider servers 130") that each have corresponding databases 135a-135n (collectively, "databases 135"). The network(s) 125 might also communicatively couple a content distributor(s) or content distributor server(s) 175 (that has corresponding database(s) 180) with each of at least one of the computing system(s) 110 and/or the one or more service provider networks 120 and with each of at least one content provider server 130 of the one or more of content provider servers 130a-130n. Each of the service provider networks 120 and 125 might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol, and/or any combination of these and/or other networks. In a particular embodiment, the network 120 or the network 125 might include an access network of the service provider (e.g., an Internet service provider ("ISP")), or the like.

System 100 might further comprise, at the one or more locations associated with the service provider 105, a temporal marker generator(s) 140 that generates one or more temporal markers that temporal increments when inserted into a transport stream of a particular media content. At the one or more locations associated with the service provider 105, system 100 might further comprise one or more transcoders 145 that insert the generated one or more temporal markers in the transport stream of the particular media content (in some cases, in the header of one or more packets of the transport stream, or the like).

In some embodiments, system 100 might also comprise one or more telecommunications relay systems 155, which might include, without limitation, one or more wireless network interfaces (e.g., wireless modems, wireless access points, and the like), one or more towers, one or more satellites, and/or the like. The one or more telecommunications relay systems 155 might provide wired or wireless communications between the service provider 105 (e.g., the computing system(s) 110 or the transcoder(s) 145, etc.) and each of one or more user devices 150a-150n (collectively, "user devices 150), each of which might comprise one or more processors 160a, and might further comprise, or might be communicatively coupled with, one or more of at least one separator 160b (which in some cases might include, without limitation, a de-multiplexer or the like), at least one decoder 160c, at least one display device 160d, and/or at least one speaker 160e. Each of the at least one separator 160b, the at least one decoder 160c, the at least one display device 160d, and/or the at least one speaker 160e might be either disposed within the user device 150 or external to the user device 150 yet communicatively coupled thereto. Merely by way of example, according to some embodiments, the one or more user devices 150 might include, without limitation, one or more of a tablet computer, a desktop computer, a television, a set-top box, a digital video recording/playback device, an audio player (e.g., CD player, MP3 player, etc.), a digital content streaming device, a gaming console, a portable gaming device, a smart phone, a mobile phone, and/or the like.

In operation, the computing system(s) 110 of the service provider 105 might receive a request for a first media content from a user via a user device 150 that is associated with the user. The computing system(s) 110 might retrieve the first media content from a database over the network. The database might be one of one or more data stores or the data lake 115 associated with the service provider, the one or more databases 135a-135n associated with corresponding one or more content providers whose servers 130a-130n might provide the first media content, or one or more databases 180 associated with the one or more content distributor servers 175 associated with one or more content distributors, and/or the like. Where databases 135 or 180 are the source of the first media content, the computing system(s) 110 might first request the first media content from the particular content provider server(s) 130 or the particular content distributor server(s) 175, respectively, which might access its own database(s) 135 or 180 and might send the requested first media content to the computing system(s) 110. Temporal marker generator 140 might generate a plurality of temporal markers at a predetermined set of increments or intervals, including, but not limited to, one-second increments, one-minute increments, two-minute increments, five-minute increments, ten-minute increments, fifteen-minute increments, thirty-minute increments, or one-hour increments, and/or the like. Transcoder 145 might insert the generated temporal markers either in the header of only each first packet of a transport stream corresponding to the start of the increment (as shown and described below, e.g., with respect to FIG. 2B) or in the header of each and every packet of the transport stream with each packet corresponding to each time increment having the same temporal marker (as shown and described below, e.g., with respect to FIG. 2A). The computing system(s) 110 might send the transport stream of the first media content to the user device 150 for presentation of the first media content to the user.

The user device 150 and/or the separator 160*b* (which, in some embodiments, might be disposed within a user device 150) might receive the transport stream. The separator(s) 160*b* might separate the transport stream into its constituent parts (i.e., video, audio, etc., where applicable), and might send the separated parts to the decoder 160*c* for decoding. The decoder 160*c* (which may be disposed within the user device 150 or may be separate but communicatively coupled to the user device 150) might decode the separated parts of the transport stream to access the media content and the temporal markers in the transport stream (which, in some cases, might be inserted in the header(s) of the packets of the transport stream), and/or the like. The user device 150 and/or processor(s) 160*a* might present any video content in the first media content to the user via a display device 160*d*, while presenting any audio content in the first media content to the user via a speaker(s) 160*e*, and might track or access the temporal markers as the first media content is being presented to the user. Once the user has stopped the presentation (e.g., if the user no longer wishes to continue viewing or listening to the first media content), or once presentation of the entire length of the first media content has completed, the user device 150 and/or processor(s) 160*a* might compile the temporal markers corresponding to the partial length of the first media content (up to the point that the presentation was stopped before the entire length) or corresponding to the full length of the first media content, and might generate a first message that comprises information regarding these temporal markers, and might send the first message to the computing system(s) 110. According to some embodiments, the temporal markers that are tracked need not be sequential or in order (i.e., in the case that the user skips whole sections of the first media content or in the case that the user jumps ahead to sections and jumps back or otherwise jumps around in terms of playback of the first media content). Regardless, the user device 150 and/or processor(s) 160*a* might track precisely which segments (by incremental section or particular interval) that is actually consumed (i.e., viewed or listened to) by the user.

The computing system(s) 110 might receive, from the user device 150, the first message comprising the list of one or more temporal markers of the plurality of temporal markers that were accessed when the first media content was presented to the user, the one or more temporal markers that were accessed being indicative of portions of the first media content that were actually presented to the user. In some embodiments, the computing system(s) 110 might calculate a first amount to bill the user based at least in part on a fraction of a cost of the first media content as calculated by dividing the first length by the total length of the first media content, and might track similar partial or full consumption of media content by the user over a billing period (e.g., per day, per week, per month, per half year, per year, etc.). In this manner, the user is not charged for portions of the media content that he or she either is unable to view or listen to or decides not to view or listen to (e.g., if the user does not like the media content so far, or the like).

The computing system(s) 110 might similarly track such partial or full consumption of media content by a plurality of users, and might send such information to analytics engine(s) 165*a* or 165*b*. The analytics engine(s) 165*a* or 165*b* might aggregate the information regarding which portions of a particular media content were actually presented to each of the plurality of users, based at least in part on the list of the at least one temporal marker contained in messages from each of a plurality of user devices associated with each of the plurality of users, and might send (or otherwise provide) the aggregated information to at least one of the one or more content provider servers 130 associated with the content provider associated with the first media content, the one or more content distributor servers 175 associated with the content distributor that distributes the first media content, or one or more advertiser servers 185 (which might have a corresponding database 190), and/or the like. Such aggregation of information regarding which portions of a particular media content were actually presented to each of the plurality of users might similarly be performed for each of a plurality of media content, and the analytics engine(s) 165*a* or 165*b* might track such information to provide trending information to the at least one of the one or more content provider servers 130 associated with the content provider associated with the plurality of media content, the one or more content distributor servers 175 associated with the content distributor that distributes the plurality of media content, or one or more advertiser servers 185 (which might have a corresponding database 190), and/or the like.

In this way, the content providers are better informed as to what parts of a movie, television show, reality TV show, game show, news program, sports coverage, music videos, video clips, music, audio clips, etc. that one or more users (or one or more demographics of users) are actually watching, in order to tailor future content that might likely view or listen to. Likewise, content distributors may be better informed as to what parts of a movie, television show, reality TV show, game show, news program, sports coverage, music videos, video clips, music, audio clips, etc. that one or more users (or one or more demographics of users) are actually watching, in order to compile or purchase, from content providers, future content that might likely view or listen to. Similarly, advertisers might be better informed as to what parts of a movie, television show, reality TV show, game show, news program, sports coverage, music videos, video clips, music, audio clips, etc. that one or more users (or one or more demographics of users) are actually watching, in order to tailor ads to users and/or to choose what portions of future content to request display of their ads to users, and/or the like. Such information may also be used by the service provider 105 to more accurately determine how much it should pay the content provider(s) and/or the content distributor(s) due to partial consumption by the plurality of users.

According to some embodiments, computing system 110 might provide the user with information regarding comparative costs for either viewing or listening to the entire video or audio content or viewing or listening to each (or a running total) of increments. For example, if the user is in the middle of watching a VOD movie, the user might pause the playback, and a message might be displayed on the screen comparing the cost for completing the movie versus the running cost for the increments of the VOD movie that the user had just actually viewed. The user can then decide whether or not to continue watching, in the case that the VOD movie being viewed is less entertaining to the user. In some cases, if the cost of the running increments exceeds the cost of viewing or listening to the entire media content, the billed amount might be capped at the cost of consuming the entire media content. In some embodiments, each increment might be priced equally, while, in some cases, one or more increments might be priced differently compared to at least one other increment (for example, the first one or more increments might cost slightly more (or less), e.g., depending on popularity of the media content or other marketing reasons, to allow for previewing, while subsequent increments might cost less (or more). Further, advertisements (whether television advertisements, online streaming advertisements, radio advertisements, music service advertisements, and/or the like) may be tracked in a similar manner, and the tracked information can be provided to the advertisers (as well as the distributors who might benefit from advertising revenue) for future ad generation/creation and/or the like.

In the embodiments above, although individual content is tracked in terms of what amount of the individual content is actually consumed by the one or more users (which may be applicable to transactional VOD ("TVOD") content, subscription VOD ("SVOD") content, audio on demand ("AOD") content, transactional AOD ("TAOD") content, subscription AOD ("SAOD") content, advertisements, and/or the like, as well as individual content in broadcast programming, specialty channel programming, cable channel programming, music channel programming, and/or the like), the various embodiments are not so limited, and similar tracking can be performed for channels of programs (for video content; e.g., broadcast channels, specialty channels, cable channels, etc.) as well as for channels of music (for audio content; e.g., radio subscriptions, satellite radio subscriptions, music service channel subscriptions, etc.). For cable subscriptions, for example, the system might track what portions of the channel lineup are actually being viewed by each user and/or collectively by a plurality of users, including particular cable channel television shows, advertisements, and/or the like, and such information can be used by the content providers, the cable channel executives, the advertisers, etc. For music, for instance, similar tracking of channels might include tracking actually listened to audio programming (versus switching of radio stations by the user, or switching music service channels, muting, skipping particular songs, etc.). In some cases, if the user only consumes the particular channels on particular days of the week (e.g., weekends or particular weekdays, etc.), depending on how much of the channel is being consumed by the user, the user might have the option of subscribing to a weekend rate or a rate for the number of days a week that the user consumes the particular channels, or an ad hoc rate for only the amount of each particular media content that is actually consumed.

Figure 2A:
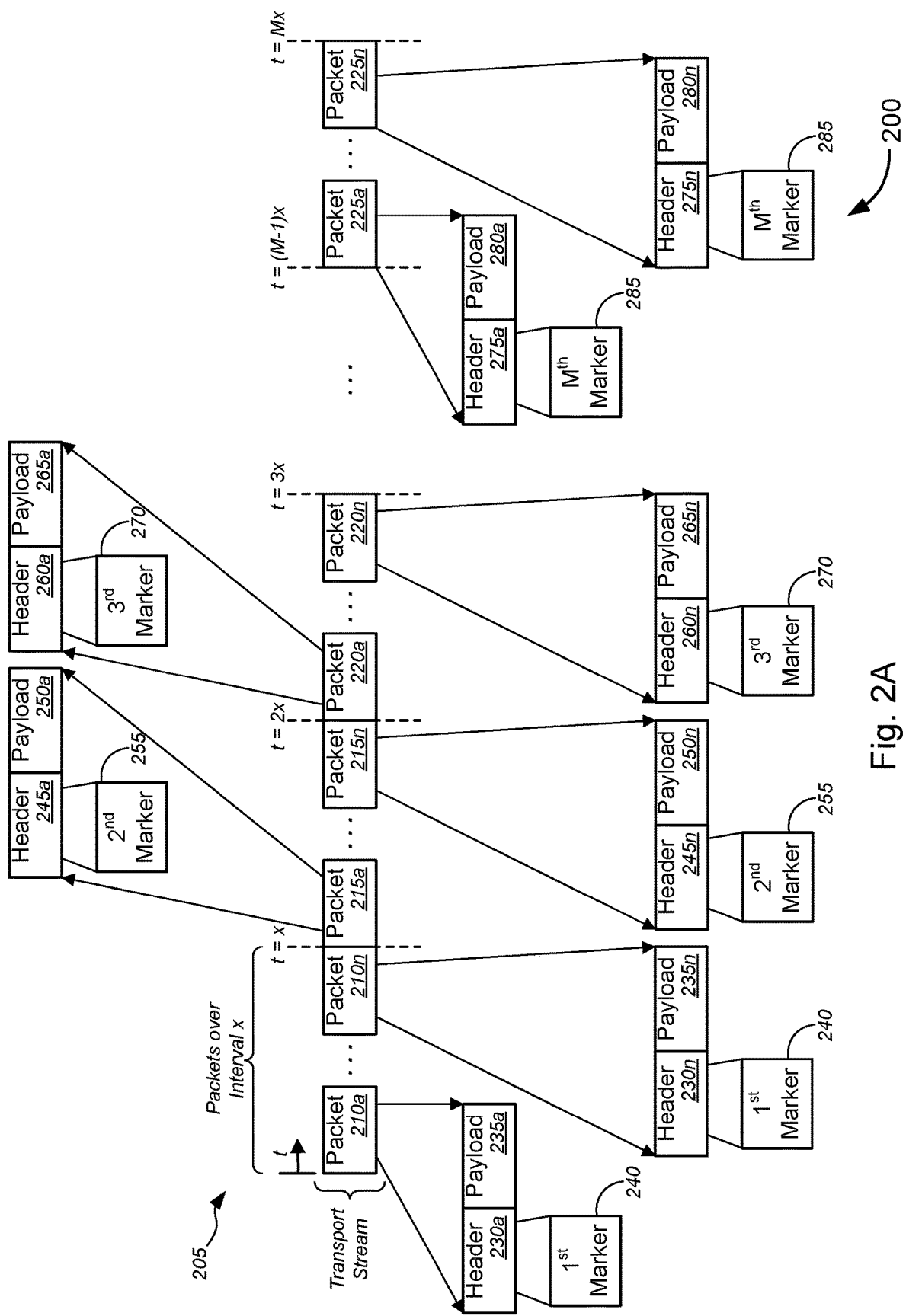
FIGS. 2A and 2B are schematic diagrams illustrating various embodiments of transport streams in which temporal markers are inserted to implement video markers for tracking at least partial playback of media content by users.
Figure 2B:
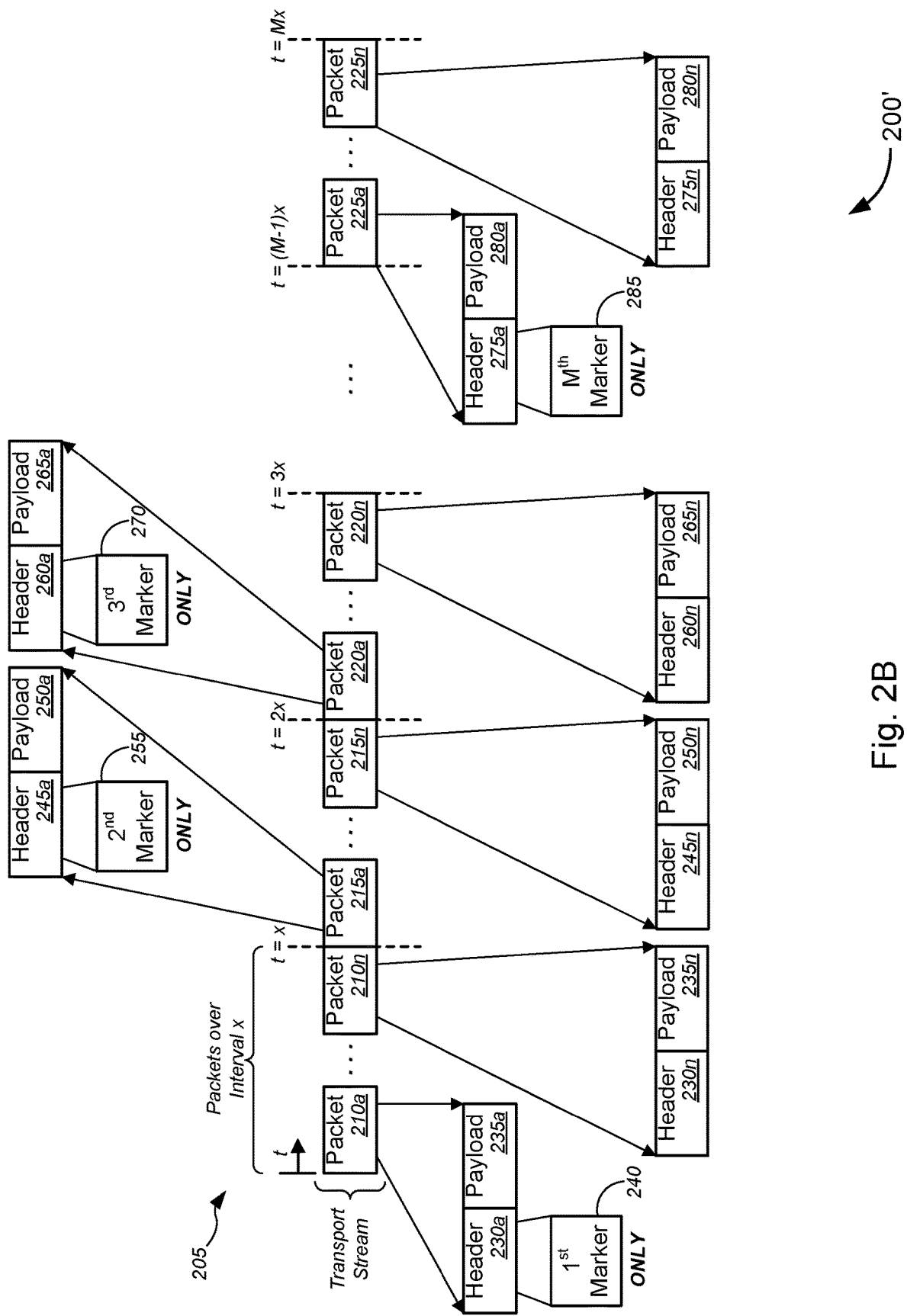

FIGS. 2A and 2B (collectively, "FIG. 2") are schematic diagrams illustrating various embodiments 200 and 200' of transport streams in which temporal markers are inserted to implement video markers for tracking at least partial playback of media content by users. FIG. 2A depicts an embodiment 200 in which the same temporal markers are inserted or embedded into the header of each packet corresponding to a predetermined increment or interval and in which packets corresponding to other increments or intervals contain other (different) temporal markers, while FIG. 2B depicts an embodiment 200' in which different temporal markers are inserted or embedded with each temporal marker being embedded or inserted into the header of only the first packet corresponding to the start of each increment or interval.

In the embodiment 200 of FIG. 2A, a media content transport stream 205 might comprise a first set of packets 210a-210n (collectively, "first packets 210," "first increment packets 210," or the like), a second set of packets 215a-215n (collectively, "second packets 215," "second increment packets 215," or the like), a third set of packets 220a-220n (collectively, "third packets 220," "third increment packets 220," or the like), through an $M^{th}$ set of packets 225a-225n (collectively, "$M^{th}$ packets 225," "$M^{th}$ increment packets 225," or the like), and/or the like. In some cases, the media content might have a total length, L, in terms of time, t, that is divisible evenly by M increments or intervals x; in other cases, the $M^{th}$ interval might be shorter than each of the first through $(M-1)^{th}$ increments or intervals x, which are equal in length, where M is any integer value. According to some embodiments, increment or interval x might include, without limitation, one of one-second increments, one-minute increments, two-minute increments, five-minute increments, ten-minute increments, fifteen-minute increments, thirty-minute increments, or one-hour increments, and/or the like. Thus, as shown in FIG. 2A, the first increment packets 210 might correspond to the first incremental x time period, while the second increment packets 215 might correspond to the next incremental x time period (i.e., from time t=x to time t=2x), and the third increment packets 220 might correspond to the next incremental x time period (i.e., from time t=2x to time t=3x), and so on, through the $M^{th}$ increment packets 225, which might correspond to the last incremental time period (i.e., from time t=(M−1)x to time t=Mx).

Each packet 210-225 might comprise a header and a payload. For example, the first of the first increment packets 210a might comprise header 230a and payload 235a, the second of the first increment packets 210b (not shown) might comprise header 230b and payload 235b, and so on, such that the $N^{th}$ one of the first increment packets 210n might comprise header 230n and payload 235n. Similarly, the first of the second increment packets 215a might comprise header 245a and payload 250a, the second of the second increment packets 215b (not shown) might comprise header 245b and payload 250b, and so on, such that the $N^{th}$ one of the second increment packets 215n might comprise header 245n and payload 250n. Likewise, the first of the third increment packets 220a might comprise header 260a and payload 265a, the second of the third increment packets 220b (not shown) might comprise header 260b and payload 265b, and so on, such that the $N^{th}$ one of the third increment packets 220n might comprise header 260n and payload 265n. And so on, such that the first of the $M^{th}$ increment packets 225a might comprise header 275a and payload 280a, the second of the $M^{th}$ increment packets 225b (not shown) might comprise header 275b and payload 280b, and so on, such that the $N^{th}$ one of the $M^{th}$ increment packets 225n might comprise header 275n and payload 280n.

According to some embodiments, a first temporal marker 240 might be inserted or embedded (by a transcoder, such as transcoder 145 of system 100 of FIG. 1, or the like) into each of the headers 230a through 230n corresponding to the first through $N^{th}$ of the first increment packets 210a-210n, while a second temporal marker 255 might be inserted or embedded (by the transcoder) into each of the headers 245a through 245n corresponding to the first through $N^{th}$ of the second increment packets 215a-215n, and a third temporal marker 270 might be inserted or embedded (by the transcoder) into each of the headers 260a through 260n corresponding to the first through N$^{th}$ of the third increment packets 220a-220n, and so on, such that an M$^{th}$ temporal marker 285 might be inserted or embedded (by the transcoder) into each of the headers 275a through 275n corresponding to the first through N$^{th}$ of the M$^{th}$ increment packets 225a-225n, and/or the like. The first temporal marker 240, the second temporal marker 255, the third temporal marker 270, through the M$^{th}$ temporal marker are different from each other. The first temporal markers 240 in the headers 230a-230n are the same. The second temporal markers 255 in the headers 245a-245n are the same. The third temporal markers 270 in the headers 260a-260n are the same. And so on, such that the M$^{th}$ temporal markers 285 in the headers 275a-275n are the same. Each of the first temporal marker 240, the second temporal marker 255, the third temporal marker 270, through the M$^{th}$ temporal marker can be in any suitable form or format and can contain any suitable number of characters that include, but are not limited to one or more of numerals, alphabetic characters, special characters, binary notations, hexadecimal notations, and/or the like.

With reference to FIG. 2B, embodiment 200' might be similar, if not identical to embodiment 200 of FIG. 2A, except that the first temporal marker 240 is inserted or embedded (by the transcoder) into only header 230a corresponding to the first of the first increment packets 210a (and not in any of headers 230b-230n corresponding to the second through N$^{th}$ of the first increment packets 210a-210n). Similarly, the second temporal marker 255 is inserted or embedded (by the transcoder) into only header 245a corresponding to the first of the second increment packets 215a (and not in any of headers 245b-245n corresponding to the second through N$^{th}$ of the second increment packets 215a-215n). Likewise, the third temporal marker 270 is inserted or embedded (by the transcoder) into only header 260a corresponding to the first of the third increment packets 220a (and not in any of headers 260b-260n corresponding to the second through N$^{th}$ of the third increment packets 220a-220n). And so on, such that the M$^{th}$ temporal marker 285 is inserted or embedded (by the transcoder) into only header 275a corresponding to the first of the M$^{th}$ increment packets 225a (and not in any of headers 275b-275n corresponding to the second through N$^{th}$ of the M$^{th}$ increment packets 225a-225n).

Figure 3A:
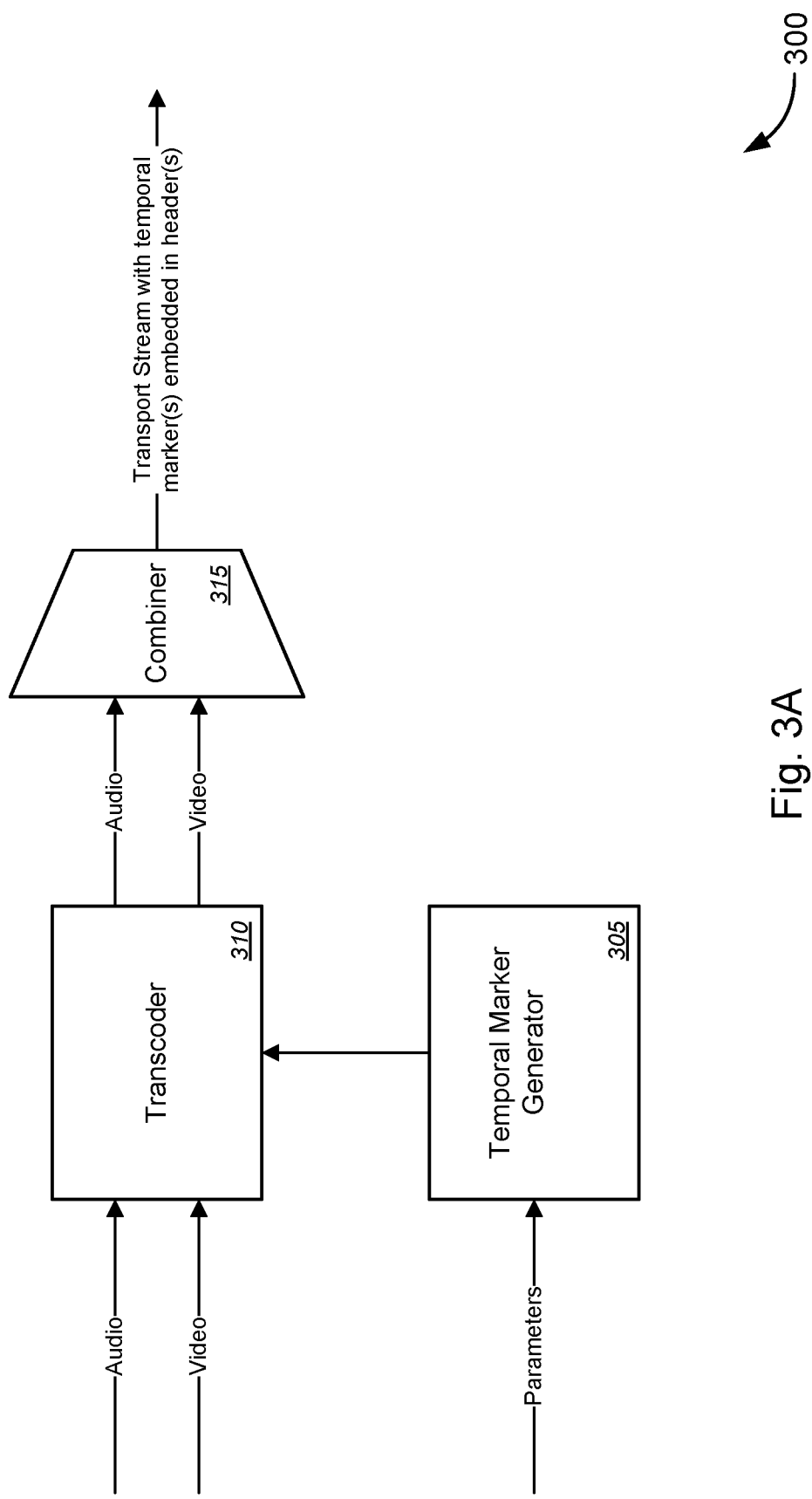
FIGS. 3A and 3B are schematic diagrams illustrating various systems for transcoding temporal markers in a media content transport stream to implement video markers for tracking at least partial playback of media content by users, in accordance with various embodiments.
Figure 3B:
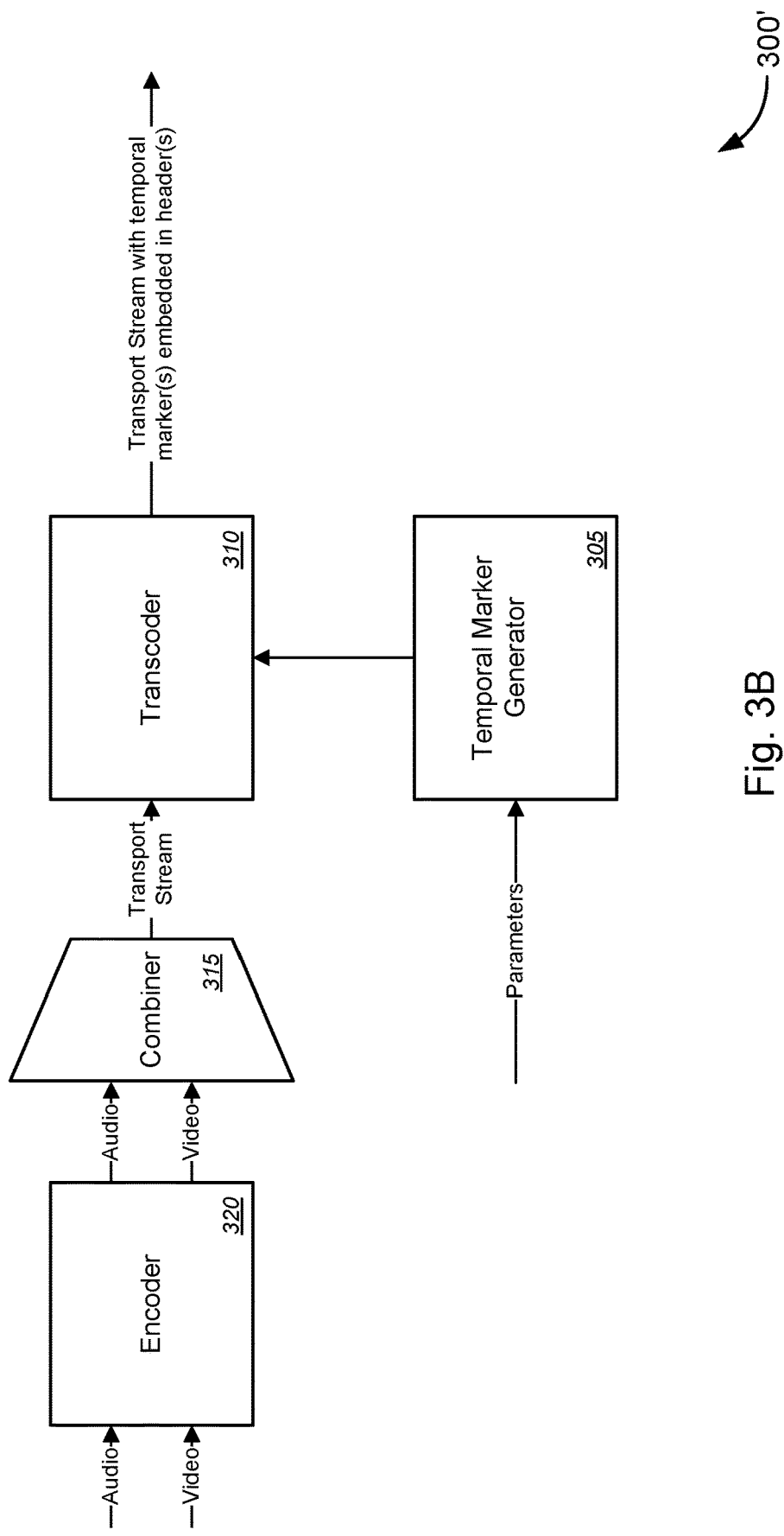

FIGS. 3A and 3B (collectively, "FIG. 3") are schematic diagrams illustrating various systems 300 and 300' for transcoding temporal markers in a media content transport stream to implement video markers for tracking at least partial playback of media content by users, in accordance with various embodiments.

In the non-limiting embodiment of FIG. 3A, system 300 might comprise a temporal marker generator(s) 305, a transcoder 310, and a combiner 315. The temporal marker generator 305 might generate a set of temporal markers, based at least in part on inputted parameters that indicate an interval or increment setting—that is, that indicates what the increment for the temporal markers should be, the increment including, but not limited to, one of one-second increments, one-minute increments, two-minute increments, five-minute increments, ten-minute increments, fifteen-minute increments, thirty-minute increments, or one-hour increments, and/or the like. The temporal marker generator 305 then sends the set of temporal markers to the transcoder 310. The transcoder 310, which receives video and/or audio content (e.g., from a content provider server and/or database (e.g., content provider server(s) 130a-130n and/or database(s) 135a-135n of system 100 in FIG. 1) or from a content distributor server and/or database (e.g., content distributor server(s) 175 and/or database(s) 180 of system 100 in FIG. 1)), might insert or embed the set of temporal markers that is received from the temporal marker generator 305 in the header of one or more packets of the transport stream containing the received video and/or audio content, in a manner as described in one of embodiment 200 of FIG. 2A or embodiment 200' of FIG. 2B, or the like. The combiner 315—which in some embodiments might include, without limitation, a multiplexer or the like—might combine (or multiplex) the various component streams of the media content (i.e., the video stream, audio stream, etc.) into a single transport stream (which might have the temporal marker embedded in the one or more headers of the packets in the transport stream). The transport stream might subsequently be sent to one or more user devices over a network (e.g., over network 120 and/or 125 of system 100 in FIG. 1, or the like). The one or more user devices, in some embodiments, might include, without limitation, one or more of a tablet computer, a desktop computer, a television, a set-top box, a digital video recording/playback device, an audio player (e.g., CD player, MP3 player, etc.), a digital content streaming device, a gaming console, a portable gaming device, a smart phone, a mobile phone, and/or the like.

With reference to the non-limiting embodiment of FIG. 3B, system 300' might be similar, if not identical to system 300 of FIG. 3A, except that a separate encoder 320 receives the video and/or audio content (e.g., from a content provider server and/or database (e.g., content provider server(s) 130a-130n and/or database(s) 135a-135n of system 100 in FIG. 1) or from a content distributor server and/or database (e.g., content distributor server(s) 175 and/or database(s) 180 of system 100 in FIG. 1)). The combiner 315—which in some embodiments might include, without limitation, a multiplexer or the like—might combine (or multiplex) the various component streams of the media content (i.e., the video stream, audio stream, etc.) into a single transport stream (which does not at this point have any temporal markers embedded in the headers of the packets therein). The transcoder 310 receives the single transport stream, receives the set of temporal markers from the temporal marker generator 305, and inserts or embeds the set of temporal markers in the header of one or more packets of the single transport stream containing the video and/or audio content, in a manner as described in one of embodiment 200 of FIG. 2A or embodiment 200' of FIG. 2B, or the like.

Figure 4:
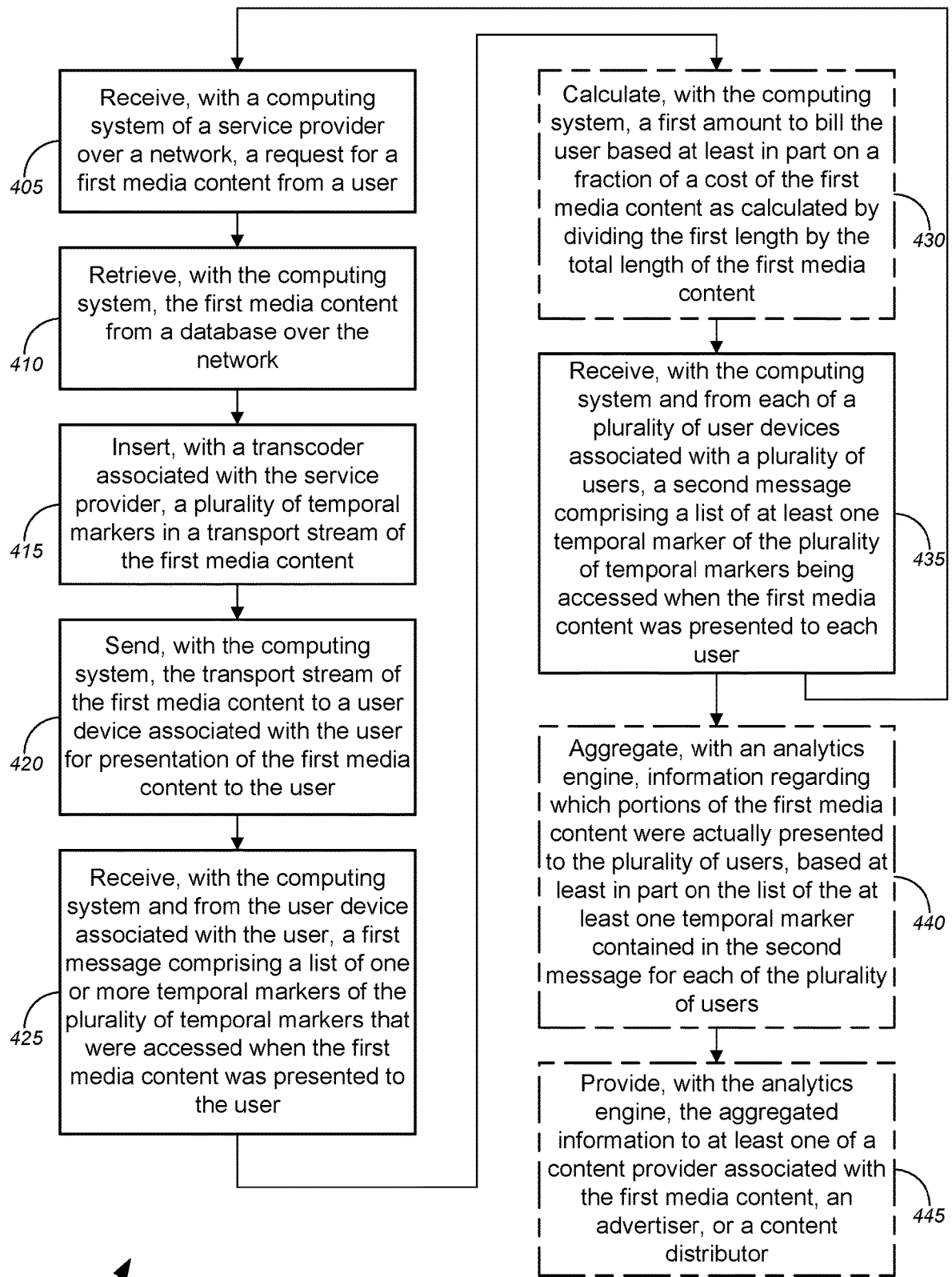
FIG. 4 is a flow diagram illustrating a method for transcoding temporal markers in a media content transport stream to implement video markers for tracking at least partial playback of media content by users, in accordance with various embodiments.

FIG. 4 is a flow diagram illustrating a method 400 for transcoding temporal markers in a media content transport stream to implement video markers for tracking at least partial playback of media content by users, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100 and 300 of FIGS. 1 and 3 respectively (or components thereof), such methods may also be implemented using any suitable hardware (or software) implementation. Similarly, while each of the systems 100 and 300 of FIGS. 1 and 3, respectively (or components thereof), can operate according to the method 400 illustrated by FIG. 4 (e.g., by executing instructions embodied on a computer readable medium), the systems 100 and 300 of FIGS. 1 and 3 can each also operate according to other modes of operation and/or perform other suitable procedures.

In the non-limiting embodiment of FIG. 4, method 400, at block 405, might comprise receiving, with a computing system (which might correspond to computing system(s) 110 of system 100 of FIG. 1, or the like) of a service provider (which might correspond to service provider 105 of system 100 of FIG. 1, or the like) over a network (which might correspond to network(s) 120 and/or 125 of system 100 of FIG. 1, or the like), a request for a first media content from a user. In some instances, the first media content might include, without limitation, at least one of video content or audio content, and/or the like. In some cases, the first media content might include, but is not limited to, video on demand ("VOD") content, or the like. In some instances, the first media content might include, but is not limited to, music on demand ("MOD") content, or the like.

At block 410, method 400 might comprise retrieving, with the computing system, the first media content from a database over the network. According to some embodiments, the database might include, without limitation, at least one of a database associated with the service provider (which might correspond to data store(s) or data lake 115 of FIG. 1, or the like), a database associated with the network (which might correspond to data store(s) or data lake 115 of FIG. 1, or the like), a database associated with the computing system (which might correspond to data store(s) or data lake 115 of FIG. 1, or the like), a database associated with a content provider that is associated with the first media content (which might correspond to database(s) 135a-135n of FIG. 1, or the like), or a database associated with a content distributor that distributes the first media content (which might correspond to database(s) 180 of FIG. 1, or the like), and/or the like.

Method 400 might further comprise inserting, with a transcoder (which might correspond to transcoder(s) 145 of FIG. 1, or the like) associated with the service provider, a plurality of temporal markers (which might correspond to temporal markers 240, 255, 270, and/or 285 of FIG. 2, or the like) in a transport stream (which might correspond to transport stream 205 of FIG. 2, or the like) of the first media content (block 415) and sending, with the computing system, the transport stream of the first media content to a user device (which might correspond to user devices 150a-150n and 150 of FIG. 1, or the like) associated with the user for presentation of the first media content to the user (block 420).

Method 400, at block 425, might comprise receiving, with the computing system and from the user device associated with the user, a first message comprising a list of one or more temporal markers of the plurality of temporal markers that were accessed when the first media content was presented to the user, the one or more temporal markers that were accessed being indicative of portions of the first media content that were actually presented to the user.

At optional block 430, method 400 might comprise calculating, with the computing system, a first amount to bill the user based at least in part on a fraction of a cost of the first media content as calculated by dividing the first length by the total length of the first media content. In other words, the computing system calculates how much to bill the user proportionate to the amount of the first media content that the user actually consumes (i.e., views and/or listens to). According to some embodiments, the temporal markers that are tracked need not be sequential or in order (i.e., in the case that the user skips whole sections of the first media content or in the case that the user jumps ahead to sections and jumps back or otherwise jumps around in terms of playback of the first media content). Regardless, the user device might track precisely which segments (by incremental section or particular interval) that is actually consumed (i.e., viewed or listened to) by the user, and the computing system might sum the length of each incremental section that was viewed (or at least partially viewed), and might divide the summed length by the total length of the first media content.

Although the processes at blocks 405-430 are directed to a single user consuming at least a portion of one particular media content, the various embodiments are not so limited, and method 400 may also be used to track, for that one particular media content, how much or what amount of the media content is being consumed (i.e., watched or heard) by each of a plurality of users. For instance, method 400, at block 435, might comprise receiving, with the computing system and from each of a plurality of user devices associated with a plurality of users, a second message comprising a list of at least one temporal marker of the plurality of temporal markers being accessed when the first media content was presented to each user, the at least one temporal marker that were accessed being indicative of portions of the first media content that were actually presented to each of the plurality of users. The method would repeat the processes at blocks 405-430 for each of the plurality of users.

Method 400 might further comprise aggregating, with an analytics engine (which might correspond to analytics engines 165a and 165b of FIG. 1, or the like), information regarding which portions of the first media content were actually presented to the plurality of users, based at least in part on the list of the at least one temporal marker contained in the second message for each of the plurality of users (at optional block 440) and providing or sending, with the analytics engine, the aggregated information to at least one of a content provider associated with the first media content, an advertiser, or a content distributor, and/or the like (at optional block 445). In this way, content providers may be better informed as to what parts of a movie, television show, reality TV show, game show, news program, sports coverage, music videos, video clips, music, audio clips, etc. that one or more users (or one or more demographics of users) are actually watching, in order to create or produce future content that might likely view or listen to. Likewise, content distributors may be better informed as to what parts of a movie, television show, reality TV show, game show, news program, sports coverage, music videos, video clips, music, audio clips, etc. that one or more users (or one or more demographics of users) are actually watching, in order to compile or purchase, from content providers, future content that might likely view or listen to. Similarly, advertisers might be better informed as to what parts of a movie, television show, reality TV show, game show, news program, sports coverage, music videos, video clips, music, audio clips, etc. that one or more users (or one or more demographics of users) are actually watching, in order to target ads to users and/or to choose what portions of future content to request display of their ads to users, and/or the like. Such information may also be used by the service provider to more accurately determine how much it should pay the content provider(s) and/or the content distributor(s) due to partial consumption by the plurality of users.

Such aggregation of information regarding which portions of a particular media content were actually presented to each of the plurality of users might similarly be performed for each of a plurality of media content, and the analytics engine(s) might track such information to provide trending information to the at least one of the content provider associated with the first media content, the advertiser, or the content distributor, and/or the like.

Figure 5:
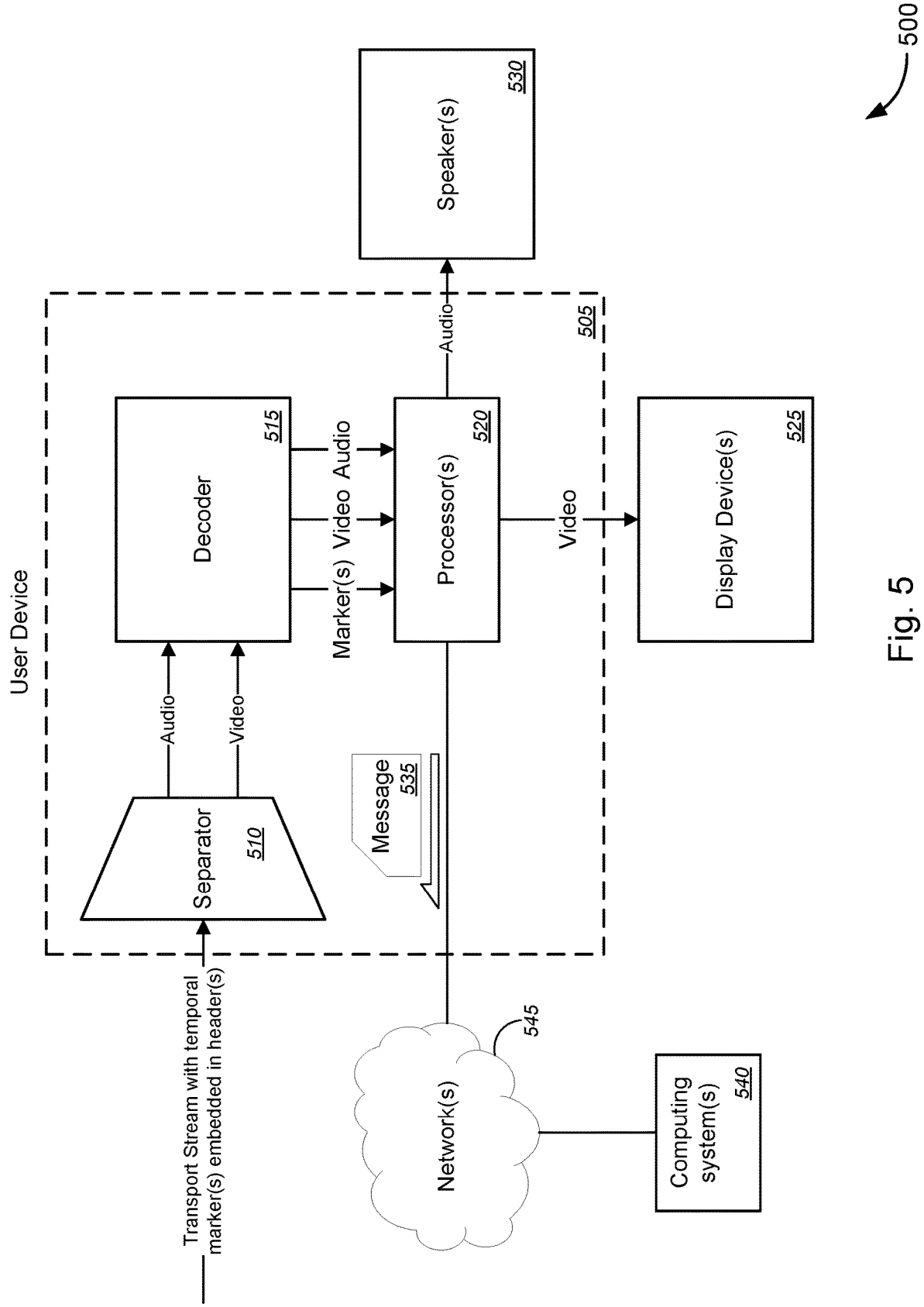
FIG. 5 is a schematic diagram illustrating a system for decoding a media content transport stream to access temporal markers as the media content is being presented to a user to implement video markers for tracking at least partial playback of media content by users, in accordance with various embodiments.

FIG. 5 is a schematic diagram illustrating a system 500 for decoding a media content transport stream to access temporal markers as the media content is being presented to a user to implement video markers for tracking at least partial playback of media content by users, in accordance with various embodiments.

In the non-limiting embodiment of FIG. 5, system 500 might comprise a user device 505, a separator 510, a decoder 515, a processor(s) 520, one or more display devices 525, one or more speakers 530, one or more networks 545, and one or more computing systems 540. According to some embodiments, the user device 505 might include, but is not limited to, at least one of a tablet computer, a desktop computer, a television, a set-top box, a digital video recording/playback device, an audio player (e.g., CD player, MP3 player, etc.), a digital content streaming device, a gaming console, a portable gaming device, a smart phone, a mobile phone, and/or the like. Although FIG. 5 depicts the separator 510 and the decoder 515 as being disposed within the user device 505, the various embodiments are not so limited, and the separator 510 and/or the decoder 515 might be separate from (i.e., external to) yet communicatively coupled to the user device 505, or might be embodied in different user devices. Similarly, although FIG. 5 depicts the display device(s) 525 and the speaker(s) 530 as being external to, yet communicatively coupled to the user device 505, the various embodiments are not so limited, and one or both of the display device(s) 525 and/or the speaker(s) 530 might be part of, or disposed within, the user device 505. For example, the separator 510 and decoder 515, in some cases might be disposed within a set-top box or the like, which might send the separated and decoded media content signal to a television or digital video recording/playback device, which might send video data to display device 525 and audio data to speaker(s) 530 for presentation of video content (e.g., VOD content or other video content) to the user. Alternatively, the separator 510 and decoder 515 might be disposed within a tablet computer or a smart phone, which might present the media content (i.e., video, audio, and/or the like) to the user via built-in display 525 (e.g., touchscreen display) and/or via built-in speakers 520 (e.g., device speakers). And so on.

According to some embodiments, the user device 505 and/or the separator 510 might receive the transport stream with the set of temporal markers embedded in the headers of the packets in the transport stream (in a manner as shown and described above with respect to embodiment 200 of FIG. 2A or embodiment 200' of FIG. 2B, or as described above with respect to FIG. 3A or 3B), and might separate the transport stream into constituent parts (e.g., video stream, audio stream, etc.). The decoder 515 might decode the various streams and might extract or access the set of temporal markers (or at least one temporal marker) that is embedded, encoded, or inserted in the headers of the packets, and might send the various decoded streams and the temporal markers to the processor(s) 520. As described above, the temporal markers, each of which is tagged with particular portions of the media content corresponding to the time increments or time intervals into which the media content is divisible, indicate which increments or intervals of the media content are being (or have been presented) to the user. The processor(s) 520 might then compile one or more temporal markers, (i) as the media content is being presented to the user (via the display device(s) 525 and/or the speaker(s) 530), (ii) after the user has stopped the presentation of the media content (e.g., if the user no longer wishes to continue viewing or listening to the media content), or (iii) after presentation of the entire length of the media content has completed. The processor(s) 520 might generate a message 535 that comprises information regarding the compiled temporal markers (which correspond to the partial length of the media content (up to the point that the presentation was stopped before the entire length) or corresponding to the full length of the media content), and might send the message 535 to the computing system 540 (which might correspond to computing system(s) 110 of system 100 of FIG. 1, or the like) via network(s) 545 (which might correspond to network(s) 120 and/or 125 of system 100 of FIG. 1, or the like).

In this manner, the computing system(s) 540 can track whether or not the user consumes just a portion or all of the media content, and, if just a portion is consumed, how much, and might calculate a bill for the user that takes into account the partial (or full) consumption of the media content, so that the user is not charged for portions of the media content that he or she either is unable to view or listen to or decides not to view or listen to (e.g., if the user does not like the media content so far, or the like).

Alternatively or additionally, the computing system(s) 540 might track such partial or full consumption of media content by a plurality of users, and might send such information to an analytics engine (e.g., analytics engine(s) 165a or 165b of system 100 of FIG. 1, or the like). The analytics engine might aggregate the information regarding which portions of a particular media content were actually presented to each of the plurality of users, based at least in part on the list of the at least one temporal marker contained in messages (similar to message 535) from each of a plurality of user devices (similar to user device 505) associated with each of the plurality of users, and might send (or otherwise provide) the aggregated information to at least one of content providers associated with the media content, content distributors that distribute the media content, or advertisers, and/or the like. Such aggregation of information regarding which portions of a particular media content were actually presented to each of the plurality of users might similarly be performed for each of a plurality of media content, and the analytics engine might track such information to provide trending information to the at least one of the content providers associated with the plurality of media content, the content distributors that distribute the plurality of media content, or advertisers, and/or the like. In this way, the content providers are better informed as to what parts of a movie, television show, reality TV show, game show, news program, sports coverage, music videos, video clips, music, audio clips, etc. that one or more users (or one or more demographics of users) are actually watching, in order to tailor future content that might likely view or listen to. Likewise, content distributors may be better informed as to what parts of a movie, television show, reality TV show, game show, news program, sports coverage, music videos, video clips, music, audio clips, etc. that one or more users (or one or more demographics of users) are actually watching, in order to compile or purchase, from content providers, future content that might likely view or listen to. Similarly, advertisers might be better informed as to what parts of a movie, television show, reality TV show, game show, news program, sports coverage, music videos, video clips, music, audio clips, etc. that one or more users (or one or more demographics of users) are actually watching, in order to tailor ads to users and/or to choose what portions of future content to request display of their ads to users, and/or the like. Such information may also be used by the service provider associated with the computing system(s) 540 to more accurately determine how much it should pay the content provider(s) and/or the content distributor(s) due to partial consumption by the plurality of users.

Figure 6:
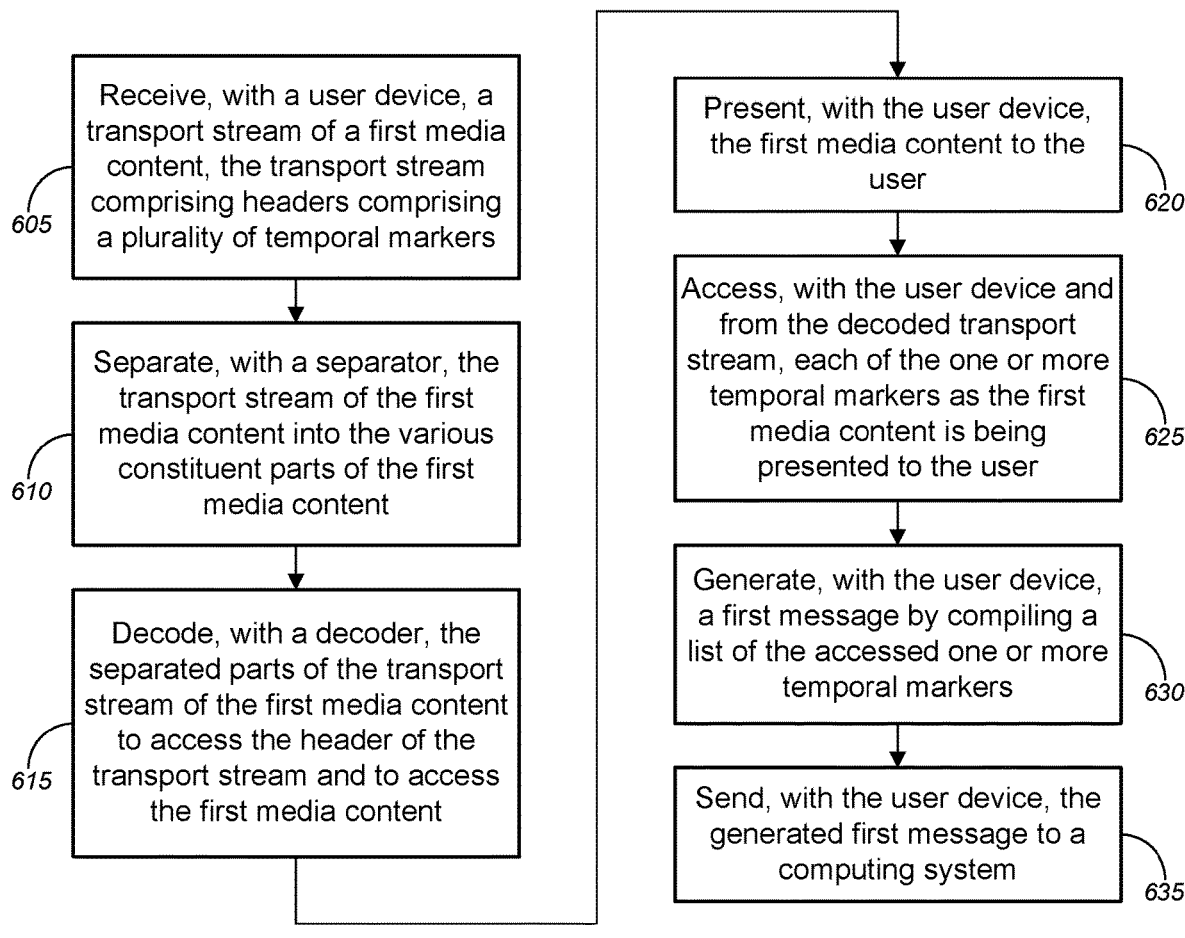
FIG. 6 is a flow diagram illustrating a method for decoding a media content transport stream to access temporal markers as the media content is being presented to a user to implement video markers for tracking at least partial playback of media content by users, in accordance with various embodiments.

FIG. 6 is a flow diagram illustrating a method 600 for decoding a media content transport stream to access temporal markers as the media content is being presented to a user to implement video markers for tracking at least partial playback of media content by users, in accordance with various embodiments.

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems 100 and 500 of FIGS. 1 and 5 respectively (or components thereof), such methods may also be implemented using any suitable hardware (or software) implementation. Similarly, while each of the systems 100 and 500 of FIGS. 1 and 5, respectively (or components thereof), can operate according to the method 600 illustrated by FIG. 6 (e.g., by executing instructions embodied on a computer readable medium), the systems 100 and 500 of FIGS. 1 and 5 can each also operate according to other modes of operation and/or perform other suitable procedures.

In the non-limiting embodiment of FIG. 6, method 600, at block 605, might comprise receiving, with a user device (which might correspond to user devices 150a-150n and 150 of FIG. 1, or the like), a transport stream of a first media content (which might correspond to transport stream 205 of FIG. 2, or the like). In some cases, the transport stream of the first media content might comprise headers comprising a plurality of temporal markers (which might correspond to temporal markers 240, 255, 270, and/or 285 of FIG. 2, or the like, in a manner as shown and described above with respect to embodiment 200 of FIG. 2A or embodiment 200' of FIG. 2B, or as described above with respect to FIG. 3A or 3B).

Method 600 might further comprise separating, with a separator (which might correspond to separators 160b and 510 of FIGS. 1 and 5, or the like) either disposed within or communicatively coupled to the user device, the transport stream of the first media content into the various constituent parts of the first media content (block 610) and decoding, with a decoder (which might correspond to decoders 160c and 515 of FIGS. 1 and 5, or the like) either disposed within or communicatively coupled to the user device, the transport stream of the first media content to access the header of the transport stream and to access the first media content (block 615). In some embodiments, the decoder might also extract or access the plurality of temporal markers (or at least one temporal marker) that is embedded, encoded, or inserted in the headers of the packets of the transport stream of the first media content. At block 620, method 600 might comprise presenting, with the user device, the decoded first media content to the user. Method 600 might further comprise, at block 625, accessing or tracking (or monitoring), with the user device and from the decoded transport stream, each of the one or more temporal markers as the first media content is being presented to the user. As described above, the temporal markers, each of which is tagged with particular portions of the media content corresponding to the time increments or time intervals into which the media content is divisible, indicate which increments or intervals of the media content are being (or have been presented) to the user. The user device might then compile one or more temporal markers, (i) as the media content is being presented to the user (via one or more display devices and/or one or more speakers), (ii) after the user has stopped the presentation of the media content (e.g., if the user no longer wishes to continue viewing or listening to the media content), or (iii) after presentation of the entire length of the media content has completed.

Method 600 might further comprise generating, with the user device, the first message by compiling a list of the accessed one or more temporal markers (block 630) and sending, with the user device, the generated first message to the computing system (block 635). According to some embodiments, the temporal markers that are tracked need not be sequential or in order (i.e., in the case that the user skips whole sections of the first media content or in the case that the user jumps ahead to sections and jumps back or otherwise jumps around in terms of playback of the first media content). Regardless, the user device might track precisely which segments (by incremental section or particular interval) that is actually consumed (i.e., viewed or listened to) by the user, and the computing system might sum the length of each incremental section that was viewed (or at least partially viewed), and might divide the summed length by the total length of the first media content.

In this manner, the computing system(s) can track whether or not the user consumes just a portion or all of the media content, and, if just a portion is consumed, how much is consumed, and might calculate a bill for the user that takes into account the partial (or full) consumption of the media content, so that the user is not charged for portions of the media content that he or she either is unable to view or listen to or decides not to view or listen to (e.g., if the user does not like the media content so far, or the like).

Exemplary System and Hardware Implementation

Figure 7:
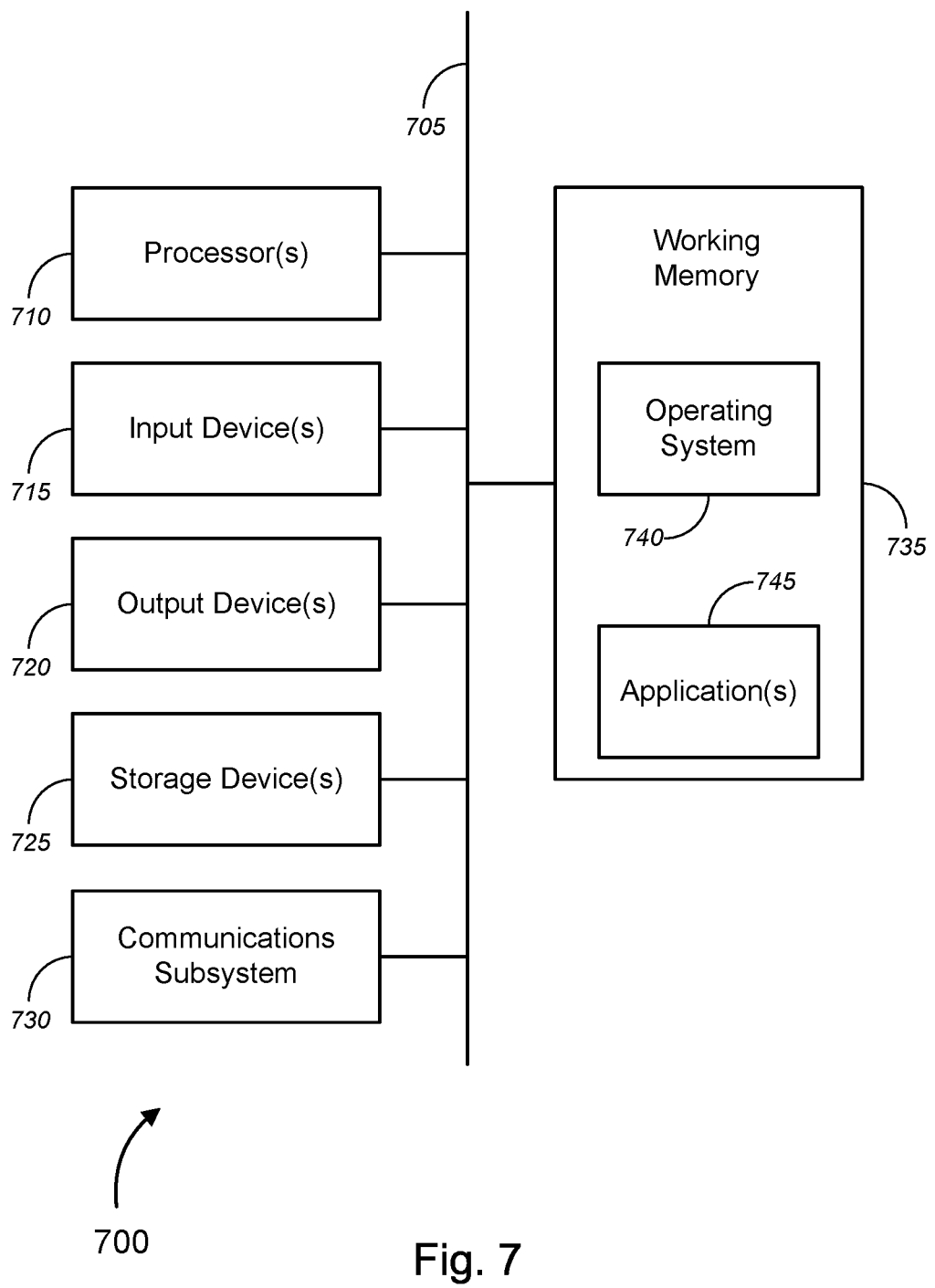
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., computing systems 110 and 540, content provider servers 130a-130n, temporal marker generators 140 and 305, transcoders 145 and 310, combiners 315, encoders 320, user devices 150a-150n, 150, and 505, separators 160b and 510, decoders 160c and 515, analytics engines 165a and 165b, content distributor servers 175, a and advertiser servers 185, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., computing systems 110 and 540, content provider servers 130a-130n, temporal marker generators 140 and 305, transcoders 145 and 310, combiners 315, encoders 320, user devices 150a-150n, 150, and 505, separators 160b and 510, decoders 160c and 515, analytics engines 165a and 165b, content distributor servers 175, a and advertiser servers 185, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, sensors, and/or the like; and one or more output devices 720, which can include, without limitation, a display device, a printer, indicator lights, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, apps, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire, and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH- EPROM, any other memory chip or cartridge, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
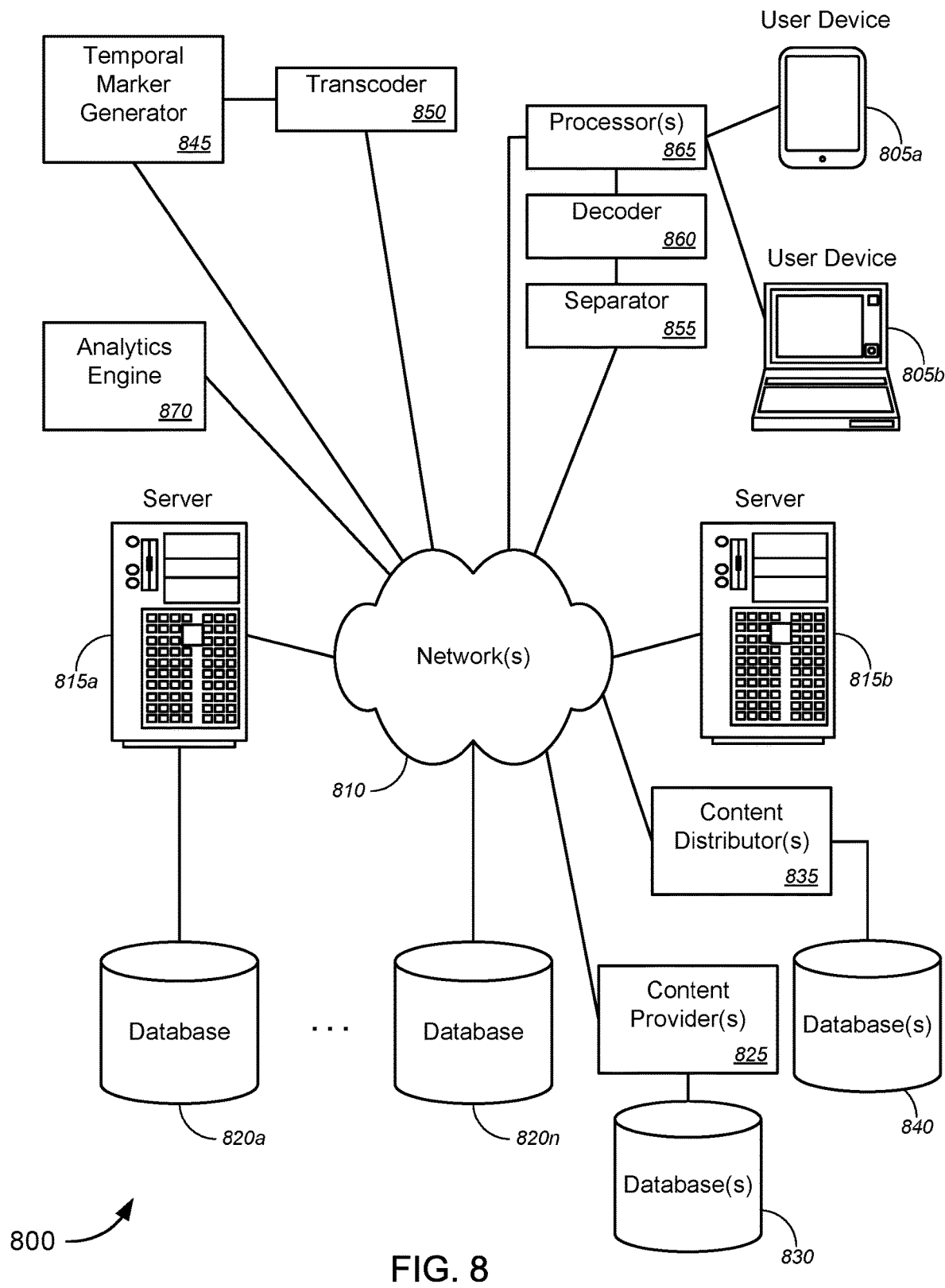
FIG. 8 is a block diagram illustrating a networked system of computers, computing systems, or system hardware architecture, which can be used in accordance with various embodiments.

As noted above, a set of embodiments comprises methods and systems for implementing media content tracking functionality, and, in particular embodiments, to methods, systems, apparatus, and computer software for implementing temporal markers for tracking at least partial playback of media content by users. FIG. 8 illustrates a schematic diagram of a system 800 that can be used in accordance with one set of embodiments. The system 800 can include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, smart phone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 810 (similar to networks 120, 125, and 545 of FIGS. 1 and 5, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing media content tracking functionality, and, in particular embodiments, to methods, systems, apparatus, and computer software for implementing temporal markers for tracking at least partial playback of media content by users, or the like, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (and/or a user computer, user device, or customer device 805). Alternatively, a database 820n can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

According to some embodiments, system 800 might further comprise one or more content provider servers 825 associated with one or more content providers, one or more databases 830 associated with the one or more content provider servers 825, one or more content distributor servers 835 associated with one or more content distributors, one or more databases 840 associated with the one or more content distributor servers 835, a temporal marker generator 845, a transcoder 850, a separator 855, a decoder 860, a processor (s) 865, and an analytics engine 870.

In some embodiments, a computing system of a service provider (which might be embodied by one or more of the servers 815a and/or 815b) might receive a request for a first media content from a user via a user device 805 (which might correspond to user devices 150a-150n, 150, and 505 of FIGS. 1 and 5, or the like) among the user devices 805a and 805b that is associated with the user. The computing system (which might correspond to computing system(s) 110 and 540 of FIGS. 1 and 5, or the like) might retrieve the first media content from a database over the network. The database might be one of one or more databases 820a-820n associated with the service provider, one or more databases 830 (which might correspond to database(s) 135a-135n of FIG. 1, or the like) associated with the one or more content providers whose servers 825 (which might correspond to content provider servers 130a-130n of FIG. 1, or the like) provide the first media content, or one or more databases 840 (which might correspond to database(s) 180 of FIG. 1, or the like) associated with the one or more content distributor servers 835 (which might correspond to content distributor server(s) 175 of FIG. 1, or the like) associated with one or more content distributors. Where databases 830 or 840 are the source of the first media content, the computing system might first request the first media content from the content provider server(s) 825 or the content distributor server(s) 835, respectively, which might access its own database(s) 830 or 840 and might send the requested first media content to the computing system. Temporal marker generator 845 (which might correspond to temporal marker generators 140 and 305 of FIGS. 1 and 3, or the like) might generate a plurality of temporal markers at a predetermined set of increments or intervals, including, but not limited to, one-second increments, one-minute increments, two-minute increments, five-minute increments, ten-minute increments, fifteen-minute increments, thirty-minute increments, or one-hour increments, and/or the like. Transcoder 850 (which might correspond to transcoders 145 and 310 of FIGS. 1 and 3, or the like) might insert the generated temporal markers either in the header of only each first packet of a transport stream corresponding to the start of the increment (as shown and described above, e.g., with respect to FIG. 2B) or in the header of each and every packet of the transport stream with each packet corresponding to each time increment having the same temporal marker (as shown and described above, e.g., with respect to FIG. 2A). The computing system might send the transport stream of the first media content to the user device 805 for presentation of the first media content to the user.

The user device 805 and/or the separator 855 (which, in some embodiments, might be disposed within a user device 805) might receive the transport stream. The separator 855 (which might correspond to separators 160b and 510 of FIGS. 1 and 5, or the like) might separate the transport stream into its constituent parts (i.e., video, audio, etc., where applicable), and might send the separated parts to the decoder 860 for decoding. The decoder 865 (which may be disposed within the user device or may be separate but communicatively coupled to the user device; and which might correspond to decoders 160c and 515 of FIGS. 1 and 5, or the like) might decode the separated parts of the transport stream to access the media content and the temporal markers in the header(s) of the packets of the transport stream, and/or the like. The user device and/or processor(s) 865 might present any video content in the first media content to the user via a display device, while presenting any audio content in the first media content to the user via a speaker(s), and might track or access the temporal markers as the first media content is being presented to the user. Once the user has stopped the presentation (e.g., if the user no longer wishes to continue viewing or listening to the first media content), or once presentation of the entire length of the first media content has completed, the user device and/or processor(s) 865 might compile the temporal markers corresponding to the partial length of the first media content (up to the point that the presentation was stopped before the entire length) or corresponding to the full length of the first media content, and might generate a first message that comprises information regarding these temporal markers, and might send the first message to the computing system.

The computing system might receive, from the user device, the first message comprising the list of one or more temporal markers of the plurality of temporal markers that were accessed when the first media content was presented to the user, the one or more temporal markers that were accessed being indicative of portions of the first media content that were actually presented to the user. In some embodiments, the computing system might calculate a first amount to bill the user based at least in part on a fraction of a cost of the first media content as calculated by dividing the first length by the total length of the first media content, and might track similar partial or full consumption of media content by the user over a billing period (e.g., per day, per week, per month, per half year, per year, etc.).

The computing system might similarly track such partial or full consumption of media content by a plurality of users, and might send such information to analytics engine 870 (which might correspond to analytics engines 165a and 165b of FIG. 1, or the like). The analytics engine 870 might aggregate the information regarding which portions of a particular media content were actually presented to each of the plurality of users, based at least in part on the list of the at least one temporal marker contained in messages from each of a plurality of user devices associated with each of the plurality of users, and might send (or otherwise provide) the aggregated information to at least one of the one or more content provider servers 825 associated with the content provider associated with the first media content, the one or more content distributor servers associated with the content distributor that distributes the first media content, or an advertiser (which might correspond to advertiser server(s) 185 of FIG. 1, or the like). These and other functions of the system 800 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with a computing system of a service provider over a network, a request for a first media content from a user;
retrieving, with the computing system, the first media content from a database over the network;
inserting, with a transcoder associated with the service provider, a plurality of temporal markers in a header of each packet of a transport stream of the first media content, each header within each temporal increment being inserted with a same temporal marker;
sending, with the computing system, the transport stream of the first media content to a user device associated with the user for presentation of the first media content to the user;
receiving, with the computing system and from the user device associated with the user, a first message comprising a first list of one or more first temporal markers of the plurality of temporal markers that were accessed when the first media content was presented to the user, the one or more first temporal markers that were accessed being indicative of portions of the first media content that were actually presented to the user, wherein the user device tracks and compiles the one or more temporal markers indicative of the portions of the first media content that were actually presented to the user as the first media content is being presented to the user;
based on receiving the one or more first temporal markers, determining, with the computing system, a first amount of the first media content that was actually presented to the user, wherein determining the first amount of the first media content that was actually presented to the user comprises determining whether at least some of the temporal markers are not sequential or in order, and wherein based on a determination that at least some of the temporal markers are not sequential or in order, determining whether the user skipped a first portion of the first media content;
receiving, with the computing system and from each of a plurality of user devices associated with a plurality of users, a second message from each of the plurality of user devices, each second message comprising a second list of one or more second temporal marker of the plurality of temporal markers being accessed when the first media content was presented to each user, the one or more second temporal markers that was accessed being indicative of one or more second portions of the first media content that were actually presented to each of the plurality of users;
sending, with the computing system, each second list of the one or more second temporal markers to an analytics engine;
aggregating, with the analytics engine, each second list of the one or more temporal markers of the plurality of temporal markers; and
based at least in part on the aggregation of each second list of the one or more second temporal markers contained in the second message for each of the plurality of users, determining, with the analytics engine, whether at least some of the one or more second temporal markers are the same for each of the plurality of user and determining, with the analytics engine, one or more second portions of the first media content that were trending across the plurality of users.

2. The method of claim 1, wherein the first media content comprises at least one of video content or audio content.

3. The method of claim 1, wherein the first media content comprises video on demand ("VOD") content.

4. The method of claim 1, wherein the database comprises at least one of a database associated with the service provider, a database associated with the network, a database associated with the computing system, a database associated with a content provider that is associated with the first media content, or a database associated with a content distributor that distributes the first media content.

5. The method of claim 1, further comprising:
receiving, with the user device, the transport stream of the first media content;
decoding, with a decoder communicatively coupled to the user device, the transport stream of the first media content;
presenting, with the user device, the decoded first media content to the user;
accessing, with the user device and from the decoded transport stream, each of the one or more temporal markers as the first media content is being presented to the user;
generating, with the user device, the first message by compiling a list of the accessed one or more temporal markers; and
sending, with the user device, the generated first message to the computing system.

6. The method of claim 1, wherein the user ends presentation of the first media content prior to completion of presentation of the first media content, wherein the one or more temporal markers being accessed indicate a first length of the first media content that was presented to the user, the first length being less than a total length of the first media content.

7. The method of claim 6, further comprising:
calculating, with the computing system, a second amount to bill the user based at least in part on a fraction of a cost of the first media content as calculated by dividing the first length by the total length of the first media content.

8. The method of claim 1, further comprising:
providing, with the analytics engine, the one or more second portions of the first media content that were trending across the plurality of users to at least one of a content provider associated with the first media content, an advertiser, or a content distributor.

9. The method of claim 1, wherein inserting the plurality of temporal markers in the transport stream of the first media content comprises inserting, with the transcoder, the plurality of temporal markers in the transport stream of the first media content only at portions of the transport stream corresponding to one of one-second increments, one-minute increments, two-minute increments, five-minute increments, ten-minute increments, fifteen-minute increments, thirty-minute increments, or one-hour increments.

10. The method of claim 1, wherein the temporal increment comprises one of one-second increments, one-minute increments, two-minute increments, five-minute increments, ten-minute increments, fifteen-minute increments, thirty-minute increments, or one-hour increments.

11. A system, comprising:
a computing system of a service provider, the computing system comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive, over a network, a request for a first media content from a user; and
retrieve the first media content from a database over the network; and
a transcoder associated with the service provider, the transcoder comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the transcoder to:
insert a plurality of temporal markers in a header of each packet of a transport stream of the first media content, each header within each temporal increment being inserted with a same temporal marker; and
send the resultant transport stream of the first media content to the computing system;
wherein the first set of instructions, when executed by the at least one first processor, further causes the computing system to:
receive the transport stream from the transcoder;
send the transport stream of the first media content to a user device associated with the user for presentation of the first media content to the user;
receive, from the user device associated with the user, a first message comprising a list of one or more temporal markers of the plurality of temporal markers that were accessed when the first media content was presented to the user, the one or more temporal markers that were accessed being indicative of portions of the first media content that were actually presented to the user, wherein the user device tracks and compiles the one or more temporal markers indicative of the portions of the first media content that were actually presented to the user as the first media content is being presented to the user;
based on receiving the temporal markers, determine a first amount of the first media content that was actually presented to the user, wherein determining the first amount of the first media content that was actually presented to the user comprises determining whether at least some of the temporal markers are not sequential or in order, and wherein based on a determination that at least some of the temporal markers are not sequential or in order, determining whether the user skipped a first portion of the first media content;
receive, from each of a plurality of user devices associated with a plurality of users, a second message from each of the plurality of user devices, each second message comprising a second list of one or more second temporal marker of the plurality of temporal markers being accessed when the first media content was presented to each user, the one or more second temporal markers that was accessed being indicative of one or more second portions of the first media content that were actually presented to each of the plurality of users; and send each second list of the one or more second temporal markers to an analytics engine;

the analytics engine, comprising:

at least one third processor; and a third non-transitory computer readable medium communicatively coupled to the at least one third processor, the third non-transitory computer readable medium having stored thereon computer software comprising a third set of instructions that, when executed by the at least one third processor, causes the analytics engine to:

aggregate each second list of the one or more temporal markers of the plurality of temporal markers; and based at least in part on the aggregation of each second list of the one or more second temporal markers contained in the second message for each of the plurality of users, determine whether at least some of the one or more second temporal markers are the same for each of the plurality of user and determine one or more second portions of the first media content that were trending across the plurality of users.

12. The system of claim 11, wherein the first media content comprises at least one of video content or audio content.

13. The system of claim 11, wherein the first media content comprises video on demand ("VOD") content.

14. The system of claim 11, wherein the database comprises at least one of a database associated with the service provider, a database associated with the network, a database associated with the computing system, a database associated with a content provider that is associated with the first media content, or a database associated with a content distributor that distributes the first media content.

15. The system of claim 11, further comprising:

a decoder communicatively coupled to the user device, the decoder comprising:

at least one fourth processor; and a fourth non-transitory computer readable medium communicatively coupled to the at least one fourth processor, the fourth non-transitory computer readable medium having stored thereon computer software comprising a fourth set of instructions that, when executed by the at least one fourth processor, causes the decoder to:

decode the transport stream of the first media content that is received by the user device;

the user device, comprising:

at least one fifth processor; and a fifth non-transitory computer readable medium communicatively coupled to the at least one fifth processor, the fifth non-transitory computer readable medium having stored thereon computer software comprising a fifth set of instructions that, when executed by the at least one fifth processor, causes the user device to:

present the decoded first media content to the user;

access, from the decoded transport stream, each of the one or more temporal markers as the first media content is being presented to the user;

generate the first message by compiling a list of the accessed one or more temporal markers; and send the generated first message to the computing system.

16. The system of claim 11, wherein the user ends presentation of the first media content prior to completion of presentation of the first media content, wherein the one or more temporal markers being accessed indicate a first length of the first media content that was presented to the user, the first length being less than a total length of the first media content.

17. The system of claim 16, wherein the first set of instructions, when executed by the at least one first processor, further causes the computing system to:

calculate a second amount to bill the user based at least in part on a fraction of a cost of the first media content as calculated by dividing the first length by the total length of the first media content.

18. The system of claim 11, wherein the third set of instructions, when executed by the at least one third processor, further causes the analytics engine to:

provide the one or more second portions of the first media content that were trending across the plurality of users to at least one of a content provider associated with the first media content, an advertiser, or a content distributor.

19. The system of claim 11, wherein inserting the plurality of temporal markers in the transport stream of the first media content comprises inserting the plurality of temporal markers in the transport stream of the first media content only at portions of the transport stream corresponding to one of one-second increments, one-minute increments, two-minute increments, five-minute increments, ten-minute increments, fifteen-minute increments, thirty-minute increments, or one-hour increments.

20. The system of claim 11, wherein the temporal increment comprises one of one-second increments, one-minute increments, two-minute increments, five-minute increments, ten-minute increments, fifteen-minute increments, thirty-minute increments, or one-hour increments.

* * * * *